(12) United States Patent
Ohsugi et al.

(10) Patent No.: US 9,656,626 B2
(45) Date of Patent: May 23, 2017

(54) GAS GENERATOR

(71) Applicant: NIPPON KAYAKU KABUSHIKI KAISHA, Chiyoda-ku (JP)

(72) Inventors: Satoshi Ohsugi, Himeji (JP); Akinori Matsumoto, Himeji (JP); Masahiro Yamaguchi, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 14/781,090

(22) PCT Filed: Mar. 28, 2014

(86) PCT No.: PCT/JP2014/059226
§ 371 (c)(1),
(2) Date: Sep. 29, 2015

(87) PCT Pub. No.: WO2014/157648
PCT Pub. Date: Oct. 2, 2014

(65) Prior Publication Data
US 2016/0052486 A1    Feb. 25, 2016

(30) Foreign Application Priority Data
Mar. 29, 2013   (JP) ................. 2013-073511

(51) Int. Cl.
*B60R 21/26* (2011.01)
*B60R 21/264* (2006.01)
*F42B 3/12* (2006.01)

(52) U.S. Cl.
CPC ............ *B60R 21/264* (2013.01); *B60R 21/26* (2013.01); *F42B 3/125* (2013.01); *B60R 2021/26029* (2013.01); *B60R 2021/26076* (2013.01)

(58) Field of Classification Search
CPC .... F42B 3/11; F42B 3/12; F42B 3/125; B60R 21/26; B60R 21/264; B60R 2021/26029; B60R 2021/26076
(Continued)

(56) References Cited

U.S. PATENT DOCUMENTS

| 6,073,963 A * | 6/2000 | Hamilton | ................ B60R 21/26 |
| | | | 102/202.14 |
| 6,341,562 B1 * | 1/2002 | Brisighella | ............. B60R 21/26 |
| | | | 102/200 |

(Continued)

FOREIGN PATENT DOCUMENTS

| CN | 101595363 A | 12/2009 |
| JP | 2001 165600 | 6/2001 |

(Continued)

OTHER PUBLICATIONS

International Search Report Issued May 13, 2014 in PCT/JP14/059226 Filed Mar. 28, 2014.

(Continued)

*Primary Examiner* — James S Bergin
(74) *Attorney, Agent, or Firm* — Oblon, McClelland, Maier & Neustadt, L.L.P.

(57) ABSTRACT

A gas generator includes a lower shell as a housing, an igniter including a squib cup and a plug, and a fixing portion formed from a resin molding for fixing the igniter to the lower shell. The squib cup includes a contact portion in contact with the plug and a non-contact portion not in contact with the plug. The fixing portion includes a cover portion secured to an outer circumferential surface of the squib cup, and the cover portion has a lower-side annular cover portion covering a part of the contact portion and an upper-side annular cover portion covering a part of the non-contact portion. A thickness t2 of the upper-side annular cover portion is smaller than a thickness t1 of the lower-side (Continued)

annular cover portion, and the cover portion is formed in a stepped shape having a substantially two-dimensionally annular step-formed surface orthogonal to an axial direction of the squib cup.

4 Claims, 11 Drawing Sheets

(58) Field of Classification Search
USPC ..... 102/202.5, 202.7, 202.9, 202.12, 202.14, 102/530; 280/741, 736
See application file for complete search history.

(56) References Cited

U.S. PATENT DOCUMENTS

| | | | |
|---|---|---|---|
| 7,111,558 B2* | 9/2006 | Brede | F42B 3/26 102/202.1 |
| 7,540,241 B2* | 6/2009 | Bierwirth | B60R 21/2644 102/202.12 |
| 8,205,554 B2* | 6/2012 | Fink | F42B 3/103 102/202.14 |
| 9,139,156 B2* | 9/2015 | Bierwirth | B60R 21/2644 |
| 2002/0115434 A1 | 8/2002 | Sasaki et al. | |
| 2002/0152919 A1 | 10/2002 | Laucht et al. | |
| 2003/0150348 A1 | 8/2003 | Furusawa et al. | |
| 2003/0183110 A1 | 10/2003 | Brede et al. | |
| 2006/0254454 A1 | 11/2006 | Bierwirth | |
| 2008/0063993 A1 | 3/2008 | Katsuda et al. | |
| 2011/0101651 A1 | 5/2011 | Bierwirth et al. | |
| 2013/0068123 A1 | 3/2013 | Lefevre et al. | |

FOREIGN PATENT DOCUMENTS

| | | |
|---|---|---|
| JP | 2008 49941 | 3/2008 |
| JP | 2010 173559 | 8/2010 |
| JP | 2010-276263 A | 12/2010 |
| JP | 2012 504073 | 2/2012 |
| WO | WO 2010/037516 A2 | 4/2010 |
| WO | 2011 151276 | 12/2011 |
| WO | 2012 093721 | 7/2012 |

OTHER PUBLICATIONS

Combined Chinese Office Action and Search Report issued Sep. 21, 2016 in Patent Application No. 201480019274.3 (with Partial English translation and English translation of categories of cited documents).

Extended European Search Report issued Oct. 24, 2016 in Patent Application No. 14776360.1.

* cited by examiner

FIG.14

| | AXIAL LENGTH FROM LOWER END OF IGNITION PORTION TO BOUNDARY SURFACE L0[mm] | DIMENSION OF LOWER-SIDE ANNULAR COVER PORTION | | DIMENSION OF UPPER-SIDE ANNULAR COVER PORTION | | WHETHER LOWER-SIDE ANNULAR COVER PORTION HAS BROKEN AND DEGREE OF BREAKAGE | WHETHER UPPER-SIDE ANNULAR COVER PORTION HAS BROKEN | WHETHER IGNITER HAS BEEN LIFTED | DETERMINATION |
|---|---|---|---|---|---|---|---|---|---|
| | | THICKNESS t1[mm] | AXIAL LENGTH L1[mm] | THICKNESS t2[mm] | AXIAL LENGTH L2[mm] | | | | |
| COMPARATIVE EXAMPLE 1 | 2.00 | 2.65 | 1.83 | — | — | NO | — | YES | NG |
| COMPARATIVE EXAMPLE 2 | 2.00 | 2.65 | 3.83 | — | — | YES (LARGE DEGREE) | — | NO | NG |
| COMPARATIVE EXAMPLE 3 | 2.00 | 2.65 | 5.63 | — | — | YES (LARGE DEGREE) | — | NO | NG |
| EXAMPLE1 | 2.00 | 2.65 | 1.83 | 0.65 | 2.83 | NO | YES | NO | GOOD |
| EXAMPLE2 | 2.00 | 2.65 | 1.83 | 0.65 | 3.18 | NO | YES | NO | GOOD |
| EXAMPLE3 | 2.00 | 2.65 | 0.93 | 1.00 | 2.93 | NO | YES | NO | GOOD |
| EXAMPLE4 | 2.00 | 2.65 | 0.93 | 1.00 | 5.63 | NO | YES | NO | GOOD |
| EXAMPLE5 | 2.00 | 2.65 | 2.93 | 1.00 | 5.63 | YES (SMALL DEGREE) | YES | NO | OK |
| EXAMPLE6 | 2.00 | 2.65 | 1.83 | 1.20 | 2.83 | NO | YES | NO | GOOD |
| EXAMPLE7 | 2.00 | 2.65 | 1.83 | 1.75 | 2.83 | NO | NO | NO | GOOD |
| EXAMPLE8 | 2.00 | 2.65 | 1.83 | 2.20 | 2.83 | YES (SMALL DEGREE) | YES | NO | OK |
| EXAMPLE9 | 2.00 | 2.65 | 0.93 | 0.65 | 2.83 | NO | YES | NO | GOOD |
| EXAMPLE10 | 2.00 | 2.65 | 2.33 | 0.65 | 2.83 | NO | YES | NO | GOOD |

GAS GENERATOR

TECHNICAL FIELD

The present invention relates to a gas generator incorporated in a passenger protection apparatus, and particularly to a gas generator incorporated in an air bag apparatus equipped in a car.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with an air bag serving as a cushion, as the air bag is expanded and developed instantaneously at the time of collision of the vehicle.

The gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag. The air bag apparatus is equipped, for example, in a steering wheel, an instrument panel, or the like of a car.

An attempt to fix an igniter to a housing through insert molding of a resin material as a source material has recently been made for a gas generator, from a point of view of reduction in weight and facilitation of manufacturing. Specifically, such a structure has been studied that, for example, a cylindrical lower shell with bottom having an opening formed in a bottom plate portion is fabricated by press-working one plate-shaped member made of metal, an igniter is arranged to pass through the opening, and a resin molding is formed by feeding an insulating fluid resin material into a space between the igniter and the lower shell and solidifying the resin material, so that the igniter is fixed to the lower shell with the formed resin molding.

Documents disclosing such a structure includes, for example, Japanese Patent Laying-Open No. 2001-165600 (PTD 1), Japanese Patent Laying-Open No. 2008-49941 (PTD 2), Japanese Patent Laying-Open No. 2010-173559 (PTD 3), and Japanese National Patent Publication No. 2012-504073 (PTD 4).

CITATION LIST

Patent Document

PTD 1: Japanese Patent Laying-Open No. 2001-165600
PTD 2: Japanese Patent Laying-Open No. 2008-49941
PTD 3: Japanese Patent Laying-Open No. 2010-173559
PTD 4: Japanese National Patent Publication No. 2012-504073

SUMMARY OF INVENTION

Technical Problem

When the structure described above is adopted, however, the igniter is actuated while the gas generator operates and an impact thereof may lead to generation of a crack in the resin molding itself or at an interface between the resin molding and a member to which the resin molding is secured. Depending on a condition of generation of the crack, the operation of the gas generator may fail.

For example, when a large crack is generated at the interface between the resin molding and the igniter, such a failure is induced that the igniter is insufficiently held during operation of the gas generator and the igniter is lifted, which leads to an unintended burning state of a gas generating agent.

In addition, when the generated crack reaches the outside of the gas generator regardless of a location of generation, a space in the housing and a space outside the housing communicate with each other in an unintended portion during operation of the gas generator. Thus, such a failure as an unintended burning state of the gas generating agent is again induced.

In this connection, the gas generator disclosed in Japanese Patent Laying-Open No. 2001-165600 is structured such that only a portion on a lower end side of an outer circumferential surface of an ignition portion which is a portion accommodating an ignition agent of the igniter is covered with the resin molding. Therefore, force for holding the igniter tends to be insufficient, and occurrence of lifting of the igniter described above during operation of the gas generator is concerned.

The gas generator disclosed in each of Japanese Patent Laying-Open No. 2008-49941, Japanese Patent Laying-Open No. 2010-173559, and Japanese National Patent Publication No. 2012-504073 is structured such that substantially the entire region of the outer circumferential surface of the ignition portion of the igniter is covered with the thick resin molding. Therefore, an impact produced at the time of actuation of the igniter is applied to the entire region of that portion and generation of a large crack reaching the outside of the gas generator described above is concerned.

Therefore, the present invention was made to solve the problems described above, and an object is to provide a gas generator capable of preventing occurrence of a failure during operation even when such a structure that an igniter is fixed to a housing with a resin molding is adopted.

Solution to Problem

A gas generator based on the present invention includes a housing, an igniter, and a fixing portion. The housing is formed from a cylindrical member constituted of a top plate portion and a bottom plate portion closing axial end portions and a circumferential wall portion provided with a gas discharge opening and accommodating a gas generating agent. The igniter is charged with an ignition agent for burning the gas generating agent. The fixing portion fixes the igniter to the bottom plate portion, and the bottom plate portion is provided with an opening. The igniter includes an ignition portion defining an ignition chamber accommodating the ignition agent and a terminal pin connected to the ignition portion for igniting the ignition agent and arranged to pass through the opening. The ignition portion has a substantially cylindrical cup body having a closed upper end and an open lower end and a plug closing the lower end of the cup body and supporting the terminal pin. The cup body includes a contact portion located on a side of the bottom plate portion and being in contact with the plug and a non-contact portion located on a side of the top plate portion and facing the ignition chamber as not being in contact with the plug. The fixing portion is formed from a resin molding secured to the bottom plate portion and the igniter, by attaching a fluid resin material to the bottom plate portion and the igniter so as to close the opening and solidifying the fluid resin material, and the resin molding includes an annular cover portion secured to an outer circumferential surface of the cup body so as to cover the outer circumferential surface. The cover portion has a lower-side annular cover portion provided on the side of the bottom plate portion so as to cover at least a part of the contact portion and an upper-side annular cover portion provided on the side of the top plate portion so as to cover at least a part of the non-contact portion. In the gas generator based on the present invention, the cover portion is formed in a stepped shape having a substantially two-dimensionally annular step-formed surface substantially orthogonal to the axial direction of the cup body, with a thickness of the upper-side annular cover portion along a radial direction being smaller than a thickness of the lower-side annular cover portion along the radial direction.

In the gas generator based on the present invention, preferably, t1 and t2 satisfy a condition of $0.24 < t2/t1 < 0.84$, where t1 represents a thickness of the lower-side annular cover portion along the radial direction and t2 represents a thickness of the upper-side annular cover portion along the radial direction.

In the gas generator based on the present invention, preferably, L0 and L1 satisfy a condition of $0.46 < L1/L0 < 1.47$, where L0 represents an axial length from an end portion of the ignition portion on the side of the bottom plate portion to a boundary surface between the contact portion and the non-contact portion and L1 represents an axial length of the lower-side annular cover portion.

In the gas generator based on the present invention, preferably, the step-formed surface is located flush with a boundary surface between the contact portion and the non-contact portion or located on the side of the bottom plate portion relative to the boundary surface along an axial direction of the housing.

In the gas generator based on the present invention, preferably, the bottom plate portion has a protruding cylindrical portion protruding toward the top plate portion, and in that case, preferably, the opening is provided at an axial end portion of the protruding cylindrical portion located on the side of the top plate portion.

Advantageous Effects of Invention

According to the present invention, when such a structure that an igniter is fixed to a housing with a resin molding is adopted as well, a gas generator capable of preventing occurrence of a failure during operation can be obtained.

BRIEF DESCRIPTION OF DRAWINGS

FIG. 14 is a table summarizing conditions and results in a verification test for verifying a condition of operation at the time when gas generators according to Examples and Comparative Examples were operated.

DESCRIPTION OF EMBODIMENTS

Figure 1:
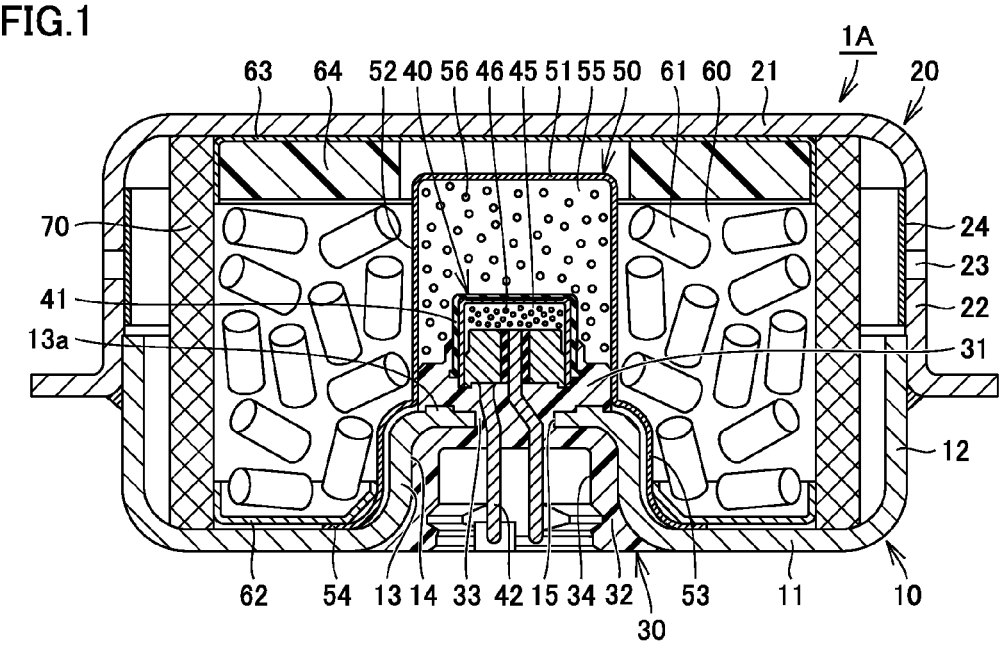
FIG. 1 is a schematic diagram of a gas generator in a first embodiment of the present invention.

An embodiment of the present invention will be described hereinafter in detail with reference to the drawings. An embodiment shown below represents application of the present invention to a disc type gas generator incorporated in an air bag apparatus equipped in a steering wheel or the like of a car. The same or common elements in the embodiments shown below have the same reference characters allotted in the drawings and description thereof will not be repeated.

First Embodiment

Figure 2:
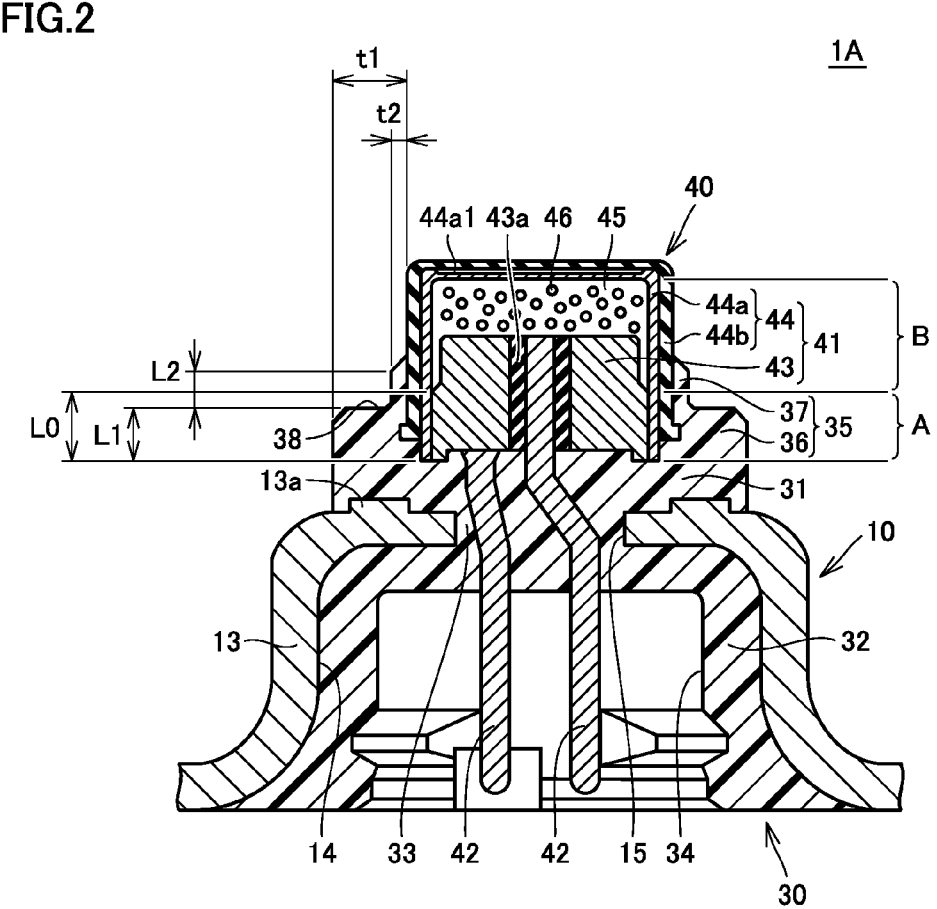
FIG. 2 is an enlarged schematic cross-sectional view showing a structure in the vicinity of an igniter of the gas generator shown in FIG. 1.
Figure 3:
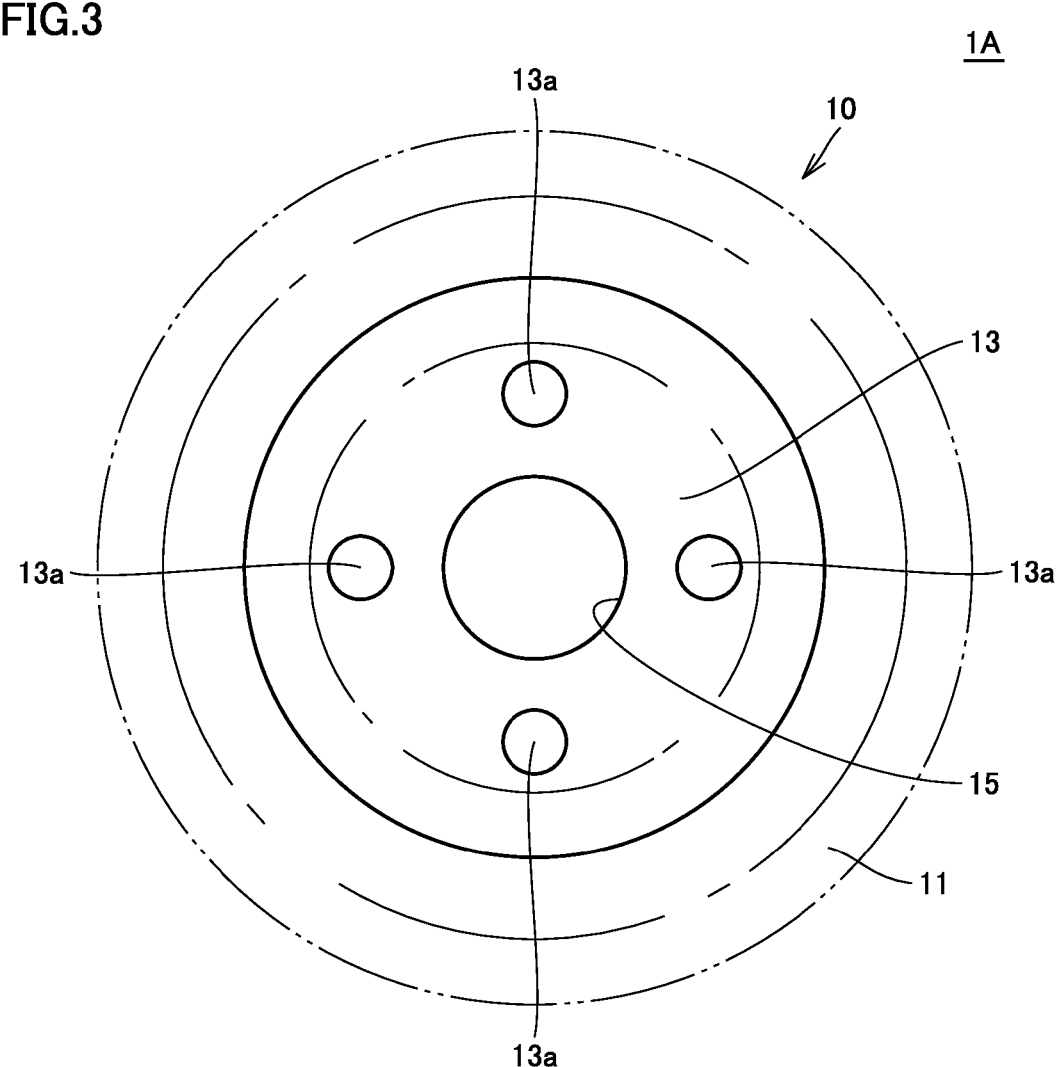
FIG. 3 is a plan view in the vicinity of a protruding cylindrical portion provided in a lower shell of the gas generator shown in FIG. 1.

FIG. 1 is a schematic diagram of a gas generator in a first embodiment of the present invention, and FIG. 2 is an enlarged schematic cross-sectional view showing a structure in the vicinity of an igniter of the gas generator shown in FIG. 1. FIG. 3 is a plan view in the vicinity of a protruding cylindrical portion provided in a lower shell of the gas generator shown in FIG. 1. A structure of a gas generator 1A in the present embodiment will initially be described with reference to these FIGS. 1 to 3.

As shown in FIG. 1, gas generator 1A in the present embodiment has a short substantially cylindrical housing having opposing axial ends closed, and is constructed to accommodate as components in this housing, a fixing portion 30, an igniter 40, an enhancer cup 50, an enhancer agent 56, a gas generating agent 61, a lower-side supporting member 62, an upper-side supporting member 63, a cushion material 64, a filter 70, and the like. In the housing, a combustion chamber 60 mainly accommodating gas generating agent 61 among the components described above is located.

The short substantially cylindrical housing includes a lower shell 10 and an upper shell 20. Each of lower shell 10 and upper shell 20 is made of a press-formed product formed by press-working a member made of metal.

Lower shell 10 and upper shell 20 are each formed in a substantially cylindrical shape with bottom, and the housing is constructed by combining and joining the shells such that open surfaces thereof face each other. Lower shell 10 has a bottom plate portion 11 and a circumferential wall portion 12 and upper shell 20 has a top plate portion 21 and a circumferential wall portion 22. The axial end portions of the housing are thus closed by top plate portion 21 and bottom plate portion 11. Electron-beam welding, laser welding, friction welding, or the like is suitably made use of for joining lower shell 10 and upper shell 20 to each other.

As shown in FIGS. 1 to 3, a protruding cylindrical portion 13 protruding toward top plate portion 21 is provided in a central portion of bottom plate portion 11 of lower shell 10, so that a depression portion 14 is formed in the central portion of bottom plate portion 11 of lower shell 10. Protruding cylindrical portion 13 is a site to which igniter 40 is fixed with fixing portion 30 described above being interposed, and depression portion 14 is a site serving as a space for providing a female connector portion 34 in fixing portion 30.

Protruding cylindrical portion 13 is formed to be in a substantially cylindrical shape with bottom, and an opening 15 in a circular shape when viewed two-dimensionally is provided at an axial end portion located on a side of top plate portion 21. Opening 15 is a site through which a pair of terminal pins 42 of igniter 40 passes. At the axial end portion located on the side of top plate portion 21 of protruding cylindrical portion 13, a plurality of protrusions 13a are provided as protruding toward top plate portion 21 so as to surround opening 15 described above.

As described above, lower shell 10 is fabricated by press-working a member made of metal. Specifically, lower shell 10 is fabricated, for example, by using a pair of molds consisting of an upper mold and a lower mold to press one plate-shaped member made of metal in a vertical direction to thereby form the plate-shaped member in a shape as illustrated.

Here, for example, a metal plate composed of stainless steel, iron steel, an aluminum alloy, a stainless alloy, or the like and having a thickness before pressing approximately not smaller than 1.5 mm and not greater than 3.0 mm is made use of as the plate-shaped member made of metal which forms lower shell 10, and suitably, what is called a high tensile steel plate which is free from such failure as fracture even at the time of application of tensile stress not lower than 440 MPa and not higher than 780 MPa is suitably made use of. Regarding a thickness after pressing, a thickness of a smallest thickness portion is preferably not smaller than approximately 1.0 mm. In addition, press-working may be carried out through hot forging or cold forging, and from a point of view of improvement in dimension accuracy, it is more suitably carried out through cold forging.

As described above, upper shell 20 is fabricated by press-working a member made of metal. Specifically, upper shell 20 is fabricated, for example, by using a pair of molds consisting of an upper mold and a lower mold to press one plate-shaped member made of metal in a vertical direction to thereby form the plate-shaped member in a shape as illustrated. Here, as in the case of lower shell 10 described above, a metal plate composed of stainless steel, iron steel, an aluminum alloy, a stainless alloy, or the like can be made use of as the plate-shaped member made of metal which forms upper shell 20.

As shown in FIG. 2, igniter 40 includes an ignition portion 41 and a pair of terminal pins 42 connected to ignition portion 41. Ignition portion 41 contains an ignition agent 46 producing flames by being ignited to burn at the time of actuation and a not-shown resistor (a bridge wire) for igniting this ignition agent 46. The pair of terminal pins 42 is connected to ignition portion 41 for igniting ignition agent 46.

More specifically, ignition portion 41 includes a squib cup 44 serving as a cup body formed from a substantially cylindrical member having a closed upper end and an open lower end and a plug 43 formed from a substantially disc-shaped member closing the lower end of squib cup 44, and ignition agent 46 and the resistor described above are accommodated in an ignition chamber 45 which is a space defined by squib cup 44 and plug 43.

Squib cup 44 has such a double-layered structure that an inner cup 44a made of metal and an outer cup 44b made of resin are layered on each other to form an upper wall and a sidewall of ignition chamber 45. Plug 43 is formed from a member made of metal and forms a lower wall of ignition chamber 45. A score 44a1 is provided in a portion of squib cup 44 forming an upper wall of inner cup 44a.

Ignition portion 41 is formed as plug 43 is introduced in the opening provided at the lower end of squib cup 44. Therefore, the sidewall of squib cup 44 has a contact portion A in contact with plug 43 and a non-contact portion B facing ignition chamber 45 as not being in contact with plug 43. Here, contact portion A is located on a side of bottom plate portion 11 of the housing and non-contact portion B is located on a side of top plate portion 21 of the housing. Squib cup 44 and plug 43 are joined to each other, for example, with welding.

Plug 43 supports the pair of terminal pins 42. Specifically, a through hole is provided in a central portion of plug 43, one of the pair of terminal pins 42 is introduced to pass through the through hole so that an insulating joint portion 43a joins the terminal pin to plug 43, and the other of the pair of terminal pins 42 is joined to a prescribed position in a lower surface of plug 43 with welding. Glass or a resin represents a specific material for insulating joint portion 43a.

The resistor described above is attached to a tip end portion of one of the pair of terminal pins 42 which is located in ignition chamber 45, for coupling to plug 43, and ignition agent 46 is located to surround the resistor or to be proximate thereto.

Here, a Nichrome wire or the like is generally made use of as a resistor, and ZPP (zirconium potassium perchlorate), ZWPP (zirconium tungsten potassium perchlorate), lead tricinate, or the like is generally made use of as ignition agent 46.

Upon sensing collision, a prescribed amount of current flows in a resistor through terminal pin 42. As the prescribed amount of current flows in the resistor, Joule heat is generated in the resistor and ignition agent 46 starts burning. Flame at a high temperature caused by burning flows out as squib cup 44 accommodating ignition agent 46 bursts, with score 44a1 being the starting point. A time period from flow of a current in the resistor until actuation of igniter 40 is generally not longer than 2 milliseconds in a case that the Nichrome wire is employed as the resistor.

Igniter 40 is attached to bottom plate portion 11 in such a manner that terminal pin 42 is introduced from the inside of lower shell 10 to pass through opening 15 provided in protruding cylindrical portion 13. Specifically, fixing portion 30 formed from a resin molding is provided around protruding cylindrical portion 13 provided in bottom plate portion 11, and igniter 40 is fixed to bottom plate portion 11 as being held by fixing portion 30.

Fixing portion 30 is formed through injection molding (more specifically, insert molding) with the use of a mold, and formed by attaching an insulating fluid resin material to bottom plate portion 11 and igniter 40 so as to reach a part of an outer surface from a part of an inner surface of bottom plate portion 11 through opening 15 provided in bottom plate portion 11 of lower shell 10 and solidifying the fluid resin material.

Igniter 40 is fixed to bottom plate portion 11 with fixing portion 30 being interposed, in such a manner that terminal pin 42 is introduced from the inside of lower shell 10 to pass through opening 15 during molding of fixing portion 30 and the fluid resin material described above is fed to fill a space between igniter 40 and lower shell 10 in this state.

For a source material for fixing portion 30 formed by injection molding, a resin material excellent in heat resistance, durability, corrosion resistance, and the like after curing is suitably selected and made use of. In that case, without being limited to a thermosetting resin represented by an epoxy resin and the like, a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like can also be made use of. In a case where these thermoplastic resins are selected as a source material, in order to ensure mechanical strength of fixing portion 30 after molding, glass fibers or the like are preferably contained as fillers in these resin materials. In a case where sufficient mechanical strength can be ensured only by a thermoplastic resin, however, a filler as described above does not have to be added.

Fixing portion 30 has an inner fixing portion 31 covering a part of an inner surface of bottom plate portion 11 of lower shell 10, an outer fixing portion 32 covering a part of an outer surface of bottom plate portion 11 of lower shell 10, and a coupling portion 33 located within opening 15 provided in bottom plate portion 11 of lower shell 10 and continuing to each of inner fixing portion 31 and outer fixing portion 32.

Fixing portion 30 is secured to bottom plate portion 11 at a surface on a side of bottom plate portion 11, of each of inner fixing portion 31, outer fixing portion 32, and coupling portion 33. Fixing portion 30 is secured to igniter 40 at each of an outer circumferential surface and a lower surface of igniter 40 which is closer to a lower end of ignition portion 41, as well as a surface of a portion of igniter 40 which is closer to an upper end of terminal pin 42. Thus, opening 15 is completely buried by terminal pin 42 and fixing portion 30, so that hermeticity of combustion chamber 60 is ensured by sealability ensured in that portion.

Here, as shown in FIG. 2, inner fixing portion 31 includes an annular cover portion 35 covering an outer circumferential surface of squib cup 44 of igniter 40. As cover portion 35 is made in a stepped shape having a step-formed surface 38, it includes a lower-side annular cover portion 36 and an upper-side annular cover portion 37. Details of these portions will be described later.

As shown in FIGS. 1 and 2, in a portion of outer fixing portion 32 of fixing portion 30, which faces the outside, female connector portion 34 is formed. This female connector portion 34 is a site for receiving a male connector (not shown) of a harness for connecting igniter 40 and a control unit (not shown) to each other, and it is located in depression portion 14 provided in bottom plate portion 11 of lower shell 10. In this female connector portion 34, a portion of igniter 40 closer to the lower end of terminal pin 42 is arranged as being exposed. The male connector is inserted in female connector portion 34, so that electrical conduction between a core wire of the harness and terminal pin 42 is established.

Here, fixing portion 30 is formed to cover a plurality of protrusions 13a provided on protruding cylindrical portion 13 described above. Specifically, the plurality of protrusions 13a are embedded in fixing portion 30 as being covered with inner fixing portion 31 of fixing portion 30. Thus, rotation of fixing portion 30 relative to bottom plate portion 11 after injection molding can be prevented.

Injection molding described above may be carried out with the use of lower shell 10 obtained by providing an adhesive layer in advance at a prescribed position on a surface of bottom plate portion 11 in a portion to be covered with fixing portion 30. The adhesive layer can be formed by applying an adhesive in advance to a prescribed position of bottom plate portion 11 and curing the adhesive.

By doing so, the cured adhesive layer is located between bottom plate portion 11 and fixing portion 30, so that fixing portion 30 formed from a resin molding can more firmly be secured to bottom plate portion 11. Therefore, rotation of fixing portion 30 relative to bottom plate portion 11 after injection molding can be prevented. In addition, by providing the adhesive layer annularly along a circumferential direction so as to surround opening 15 provided in bottom plate portion 11, higher sealability can also be ensured in that portion.

For the adhesive applied in advance to bottom plate portion 11, an adhesive containing as a source material, a resin material excellent in heat resistance, durability, corrosion resistance, and the like after curing is suitably made use of, and for example, an adhesive containing a cyanoacrylate-based resin or a silicone-based resin as a source material is particularly suitably made use of. An adhesive containing, other than the resin materials described above, a phenol-based resin, an epoxy-based resin, a melamine-based resin, a urea-based resin, a polyester-based resin, an alkyd-based resin, a polyurethane-based resin, a polyimide-based resin, a polyethylene-based resin, a polypropylene-based resin, a polyvinyl chloride-based resin, a polystyrene-based resin, a polyvinyl acetate-based resin, a polytetrafluoroethylene-based resin, an acrylonitrile butadiene styrene-based resin, an acrylonitrile styrene-based resin, an acryl-based resin, a polyamide-based resin, a polyacetal-based resin, a polycarbonate-based resin, a polyphenylene ether-based resin, a polybutylene terephthalate-based resin, a polyethylene terephthalate-based resin, a polyolefin-based resin, a polyphenylene sulfide-based resin, a polysulfone-based resin, a polyether sulfone-based resin, a polyarylate-based resin, a polyether ether ketone-based resin, a polyamide imide-based resin, a liquid crystal polymer, styrene-based rubber, olefin-based rubber, and the like can be made use of as the adhesive described above.

Though a position of application of the adhesive is not particularly limited, for example, the adhesive can be applied to the entire outer surface or a part of the outer surface of a portion of bottom plate portion 11 where protruding cylindrical portion 13 is formed (that is, a surface of bottom plate portion 11 in a portion of fixing portion 30, which is covered with outer fixing portion 32), to the entire inner surface or a part of the inner surface of a portion of bottom plate portion 11 where protruding cylindrical portion 13 is formed (that is, a surface of bottom plate portion 11 in a portion of fixing portion 30, which is covered with inner fixing portion 31), or to the entire surface of bottom plate portion 11 in a portion covered with fixing portion 30.

The adhesive layer may be provided by applying an adhesive in advance to a prescribed position on a surface of igniter 40 in a portion to be covered with fixing portion 30. According to such a construction, as in the case that the adhesive layer is provided in advance on bottom plate portion 11 described above, fixing portion 30 formed from a resin molding can more firmly be secured to igniter 40 and higher sealability can be ensured in that portion.

As shown in FIG. 1, enhancer cup 50 is assembled to bottom plate portion 11 so as to cover protruding cylindrical portion 13, fixing portion 30, and igniter 40. Enhancer cup 50 has a substantially cylindrical shape having an open end portion on the side of bottom plate portion 11, and contains an enhancer chamber 55 accommodating enhancer agent 56. Enhancer cup 50 is arranged to protrude toward combustion chamber 60 accommodating gas generating agent 61, such that enhancer chamber 55 provided therein faces ignition portion 41 of igniter 40.

Enhancer cup 50 has a top wall portion 51 and a sidewall portion 52 defining enhancer chamber 55 described above and an extension portion 53 extending radially outward from a portion of sidewall portion 52 on a side of an open end. Extension portion 53 is formed to extend along an inner bottom surface of bottom plate portion 11 of lower shell 10, and more specifically, curved to have a cross-section substantially in an S shape along a shape of the inner bottom surface of bottom plate portion 11 in a portion where protruding cylindrical portion 13 is provided and in the vicinity thereof. Extension portion 53 of enhancer cup 50 includes a tip end portion 54 extending like a flange in a radially outer portion thereof.

A portion of enhancer cup 50 on a side of the open end of sidewall portion 52 is pressed into cover portion 35 of fixing portion 30 (more strictly, lower-side annular cover portion 36). Tip end portion 54 provided in extension portion 53 of enhancer cup 50 is sandwiched between bottom plate portion 11 and lower-side supporting member 62. Thus, enhancer cup 50 is fixed to fixing portion 30 and bottom plate portion 11.

Enhancer cup 50 has an opening in neither of top wall portion 51 and sidewall portion 52 and surrounds enhancer chamber 55 provided therein. This enhancer cup 50 bursts or melts with increase in pressure in enhancer chamber 55 or conduction of heat generated therein when enhancer agent 56 is ignited as a result of actuation of igniter 40, and mechanical strength thereof is relatively low.

Therefore, a member made of metal such as aluminum or an aluminum alloy or a member made of resin such as a thermosetting resin represented by an epoxy resin and the like and a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like is suitably made use of for enhancer cup 50.

In addition to the above, a component formed from a member made of metal high in mechanical strength as represented by iron or copper, having an opening in sidewall portion 52 thereof, and having a sealing tape adhered to close the opening can also be made use of for enhancer cup 50.

Enhancer agent 56 charged into enhancer chamber 55 generates thermal particles as it is ignited to burn by flames produced as a result of actuation of igniter 40. Enhancer agent 56 should be able to reliably start burning gas generating agent 61, and generally, a composition or the like composed of metal powders/oxidizing agent represented by $B/KNO_3$ or the like is employed. For enhancer agent 56, a powdery enhancer agent, an enhancer agent formed in a prescribed shape by a binder, or the like is made use of. A shape of enhancer agent 56 formed by a binder includes, for example, various shapes such as a granule, a column, a sheet, a sphere, a cylinder with a single hole, a cylinder with multiple holes, a tablet, and the like.

In a space surrounding a portion where enhancer cup 50 described above is arranged in a space inside the housing constituted of lower shell 10 and upper shell 20, combustion chamber 60 accommodating gas generating agent 61 is located. Specifically, as described above, enhancer cup 50 is arranged to protrude into combustion chamber 60 formed in the housing, and a space provided in a portion of this enhancer cup 50 facing the outer surface of sidewall portion 52 is formed as combustion chamber 60.

Gas generating agent 61 is an agent which is ignited by thermal particles generated as a result of actuation of igniter 40 and produces a gas as it burns. A non-azide-based gas generating agent is preferably employed as gas generating agent 61, and gas generating agent 61 is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. In addition, as the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. Moreover, as the additive, a binder, a slag formation agent, a combustion modifier, or the like is exemplified. As the binder, for example, metal salt of carboxymethyl cellulose, an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. In addition, as the combustion modifier, a metal oxide, ferrosilicon, activated carbon, graphite, or the like can suitably be made use of.

A shape of a molding of gas generating agent 61 includes various shapes such as a particulate shape including a granule, a pellet, and a column, and a disc shape. In addition, among columnar moldings, a molding with holes having holes in the molding (such as a cylindrical shape with a single hole or a cylindrical shape with multiple holes) is also made use of. These shapes are preferably selected as appropriate depending on specifications of an air bag apparatus in which gas generator 1A is incorporated, and for example, a shape optimal for the specifications is preferably selected by selecting a shape allowing change over time of a rate of generation of a gas during burning of gas generating agent 61. Furthermore, in addition to a shape of gas generating agent 61, a size of a molding or an amount thereof for filling is preferably selected as appropriate, in consideration of a linear burning velocity, a pressure exponent, or the like of gas generating agent 61.

In a space surrounding combustion chamber 60 in a radial direction of the housing, filter 70 is arranged along an inner circumference of the housing. Filter 70 has a cylindrical shape, and as a central axis is arranged to substantially match with the axial direction of the housing, the filter radially surrounds combustion chamber 60 accommodating gas generating agent 61.

For example, a filter obtained by winding and sintering a metal wire rod of stainless steel or iron steel, a filter formed by press-working a mesh material into which metal wire rods are knitted to thereby pack the same, a filter obtained by winding a perforated metal plate, or the like is made use of as filter 70. Here, as the mesh material, specifically, a wire gauze of stocking stitch, a plain-woven wire gauze, an aggregate of crimped metal wire rods, or the like is made use of. In addition, as the perforated metal plate, for example, expanded metal obtained by making staggered cuts in a metal plate and forming holes by widening the cuts to thereby work the metal plate in a mesh, hook metal obtained by perforating a metal plate and collapsing burrs caused around a periphery of the hole for flattening, or the like is made use of. In this case, a size or a shape of a hole to be formed can be changed as appropriate as required, and holes different in size or shape may be included in the same metal plate. It is noted that, for example, a steel plate (mild steel) or a stainless steel plate can suitably be made use of as a metal plate, and a nonferrous metal plate of aluminum, copper, titanium, nickel, or an alloy thereof, or the like can also be made use of.

Filter 70 functions as cooling means for cooling a gas by depriving heat at a high temperature of the gas when the gas produced in combustion chamber 60 passes through this filter 70 and also functions as removal means for removing slag (residues) or the like contained in the gas.

A plurality of gas discharge openings 23 are provided in circumferential wall portion 22 of upper shell 20 in a portion facing filter 70. This gas discharge opening 23 serves for guiding a gas which has passed through filter 70 to the outside of the housing. To a main surface of circumferential wall portion 22 of upper shell 20, which is located on a side of filter 70, a sealing tape 24 is attached to close gas discharge opening 23. An aluminum foil or the like having an adhesive member applied to its one surface is made use of as this sealing tape 24. Thus, hermeticity of combustion chamber 60 is ensured.

In the vicinity of the end portion of combustion chamber 60 located on the side of bottom plate portion 11, lower-side supporting member 62 is arranged. Lower-side supporting member 62 has a cylindrical shape with bottom, which is provided with an opening in a bottom portion, and is arranged as substantially being applied to filter 70 and bottom plate portion 11 so as to cover a boundary portion between filter 70 and bottom plate portion 11. Thus, lower-side supporting member 62 is located between bottom plate portion 11 and gas generating agent 61 in the vicinity of the end portion of combustion chamber 60.

Lower-side supporting member 62 is flow-out prevention means for preventing a gas generated in combustion chamber 60 during actuation from flowing out through a gap between the lower end of filter 70 and bottom plate portion 11 without passing through filter 70. Lower-side supporting member 62 is formed, for example, by press-working a plate-shaped member made of metal, and suitably made of a member formed from a steel plate of common steel, special steel, or the like (such as a cold rolled steel plate or a stainless steel plate).

Upper-side supporting member 63 is arranged at the end portion of combustion chamber 60 located on the side of top plate portion 21. Upper-side supporting member 63 has a cylindrical shape with bottom, and is arranged as being applied to filter 70 and top plate portion 21 so as to cover the boundary portion between filter 70 and top plate portion 21. Thus, upper-side supporting member 63 is located between top plate portion 21 and gas generating agent 61 in the vicinity of the end portion of combustion chamber 60.

Upper-side supporting member 63 is flow-out prevention means for preventing a gas generated in combustion chamber 60 during actuation from flowing out through a gap between the upper end of filter 70 and top plate portion 21 without passing through filter 70. Similarly to lower-side supporting member 62, upper-side supporting member 63 is formed, for example, by press-working a plate-shaped member made of metal, and suitably made of a member formed from a steel plate of common steel, special steel, or the like (such as a cold rolled steel plate or a stainless steel plate).

In this upper-side supporting member 63, an annular cushion material 64 is arranged to be in contact with gas generating agent 61 accommodated in combustion chamber 60. Cushion material 64 is thus located between top plate portion 21 and gas generating agent 61 in a portion of combustion chamber 60 on the side of top plate portion 21 and presses gas generating agent 61 toward bottom plate portion 11. This cushion material 64 is provided for the purpose of preventing gas generating agent 61 made of a molding from being crushed by vibration or the like, and made of a member suitably formed of a molding of ceramic fibers, rock wool, or a foamed resin (such as foamed silicone).

An operation of gas generator 1A in the present embodiment described above will now be described with reference to FIG. 1.

When a vehicle on which gas generator 1A in the present embodiment is mounted collides, collision sensing means separately provided in the vehicle senses collision, and based thereon, igniter 40 is actuated in response to power feed through a control unit separately provided in the vehicle. Enhancer agent 56 accommodated in enhancer chamber 55 is ignited to burn by flames produced as a result of actuation of igniter 40, to thereby generate a large amount of thermal particles. Burning of this enhancer agent 56 bursts or melts enhancer cup 50 and the thermal particles described above flow into combustion chamber 60.

The thermal particles which have flowed in ignite and burn gas generating agent 61 accommodated in combustion chamber 60 and a large amount of gas is produced. The gas produced in combustion chamber 60 passes through filter 70. At that time, heat is deprived of the gas through filter 70 and the gas is cooled, slag contained in the gas is removed by filter 70, and the gas flows into an outer peripheral portion of the housing.

As an internal pressure in the housing increases, sealing by sealing tape 24 which has closed gas discharge opening 23 of upper shell 20 is broken, and the gas is discharged to the outside of the housing through gas discharge opening 23. The discharged gas is introduced in the air bag provided adjacent to gas generator 1A and it expands and develops the air bag. The operation of gas generator 1A is completed as above.

Referring to FIG. 2, as described above, in gas generator 1A in the present embodiment, fixing portion 30 formed from a resin molding includes annular cover portion 35 secured to the outer circumferential surface of squib cup 44 of igniter 40 so as to cover the outer circumferential surface, and cover portion 35 has lower-side annular cover portion 36 located on the side of bottom plate portion 11 and upper-side annular cover portion 37 located on the side of top plate portion 21.

Here, lower-side annular cover portion 36 is provided to cover a part of contact portion A of squib cup 44 and upper-side annular cover portion 37 is provided to cover a part of non-contact portion B of squib cup 44. A thickness t2 of upper-side annular cover portion 37 along the radial direction is set to be smaller than a thickness t1 of lower-side annular cover portion 36 along the radial direction that is, t1>t2).

Thus, cover portion 35 is formed in a stepped shape having substantially two-dimensionally annular step-formed surface 38 substantially orthogonal to the axial direction of squib cup 44, and ignition portion 41 of igniter 40 is held by cover portion 35 having the stepped shape in the radial direction.

Lower-side annular cover portion 36 is a site provided to mainly exhibit holding force for preventing igniter 40 from falling from fixing portion 30 also during operation of gas generator 1A. Upper-side annular cover portion 37 is a site provided to mainly receive an impact generated as a result of actuation of igniter 40 during operation of gas generator 1A.

According to such a construction, generation of an unintended crack leading to a failure in operation of gas generator 1A at fixing portion 30 itself formed from a resin molding or at the interface between fixing portion 30, and lower shell 10 and igniter 40 (in particular, igniter 40) which are members to which the fixing portion is secured, due to an impact generated as a result of actuation of igniter 40 during operation of gas generator 1A can reliably be prevented. The reason will be described below in detail.

Figure 4:
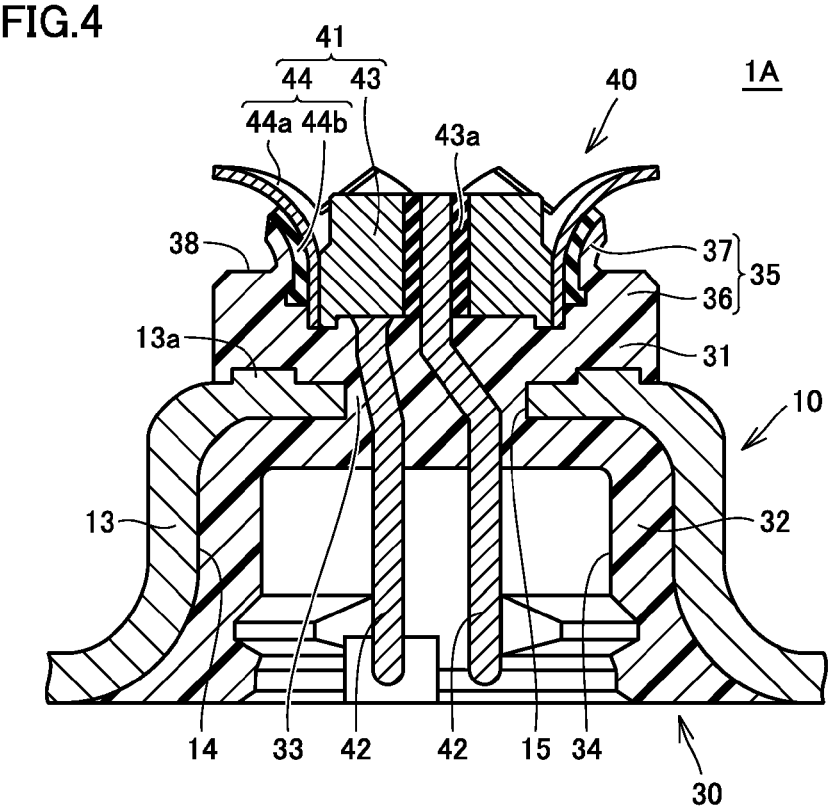
FIG. 4 is a schematic cross-sectional view showing a state in the vicinity of the igniter after operation of the gas generator shown in FIG. 1.
Figure 5:
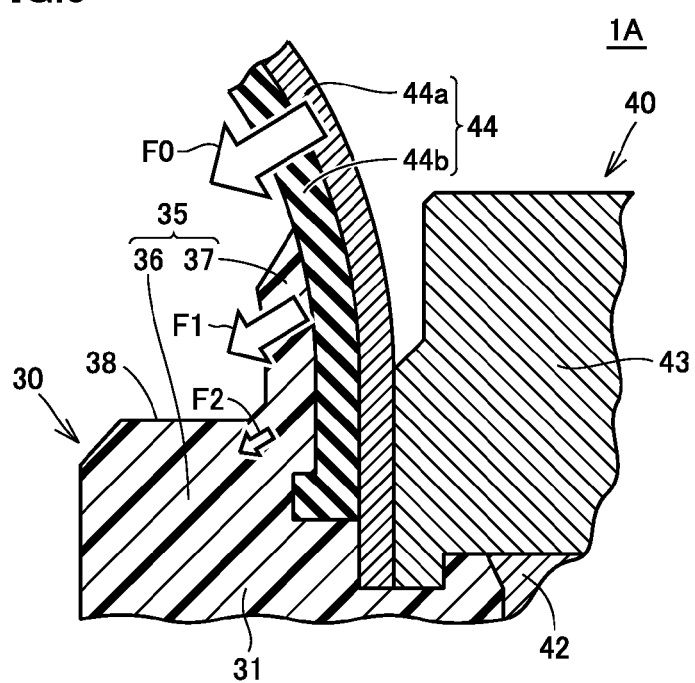
FIG. 5 is a schematic diagram for illustrating a reason why a failure does not occur during operation in the gas generator shown in FIG. 1.

FIG. 4 is a schematic cross-sectional view showing a state in the vicinity of the igniter after operation of the gas generator shown in FIG. 1, and FIG. 5 is a schematic diagram for illustrating a reason why a failure does not occur during operation, in the gas generator shown in FIG. 1.

As described above, when igniter 40 is actuated, squib cup 44 bursts from score 44a1 which is a starting point as ignition agent 46 starts burning. Here, since a pressure in ignition chamber 45 has significantly increased, a portion of burst of squib cup 44 widely opens radially outward, and consequently a state after operation of gas generator 1A is as shown in FIG. 4. Here, since the portion of burst of squib cup 44 deforms as it receives a pressure in ignition chamber 45 described above, a base of deformation is in the vicinity of a boundary surface between contact portion A and non-contact portion B of squib cup 44.

Here, since cover portion 35 has the stepped shape as described above, an impact (force thereof being represented as F0 in the figure) generated at the time of burst of squib cup 44 is mainly applied to upper-side annular cover portion 37 (force thereof being represented as F1 in the figure) of cover portion 35 as shown in FIG. 5, and a ratio of direct application of the impact to lower-side annular cover portion 36 lowers. In addition, since cover portion 35 has the stepped shape, upper-side annular cover portion 37 deforms as it receives force F1 and hence energy thereof is spent for deformation of upper-side annular cover portion 37. Thus, force transmitted to lower-side annular cover portion 36 through upper-side annular cover portion 37 is also significantly weak.

Therefore, the impact applied to lower-side annular cover portion 36 (force thereof being represented as F2 in the figure) is not strong enough to generate a crack in lower-side annular cover portion 36 itself or at the interface between lower-side annular cover portion 36 and igniter 40, and an unintended crack leading to a failure in operation of gas generator 1A is not generated in such a portion.

Deformation of upper-side annular cover portion 37 described above is not limited simply to such deformation as opening in a radially outward direction, and such deformation as breakage due to fracture or chipping may be applicable. Namely, since upper-side annular cover portion 37 is provided for the purpose of mitigating an impact which would be applied to lower-side annular cover portion 36 if it is not provided, breakage thereof does not give rise to a problem so long as no crack is generated in lower-side annular cover portion 36 itself or at the interface between lower-side annular cover portion 36 and igniter 40 which is a member to which it is secured (in particular, igniter 40).

As described above, with gas generator 1A in the present embodiment, generation of a large crack at the interface between fixing portion 30 formed from a resin molding and igniter 40 or generation of a large crack as reaching the outside of gas generator 1A at fixing portion 30 itself formed from a resin molding or at the interface between fixing portion 30, and lower shell 10 and igniter 40 to which it is secured can be prevented. Therefore, occurrence of a failure during operation such as an unintended state of burning of gas generating agent 61 due to lifting of igniter 40 or spurt of flame to the outside of gas generator 1A can reliably be prevented.

In order to more reliably achieve the effect described above, referring to FIG. 2, gas generator 1A is preferably constructed such that a condition of $0.24 < t2/t1 < 0.84$ is satisfied, where t1 represents a thickness of lower-side annular cover portion 36 along the radial direction and t2 represents a thickness of upper-side annular cover portion 37 along the radial direction (a first condition).

This is because, with $t2/t1 \leq 0.24$, upper-side annular cover portion 37 is too small in thickness and hence absorption of an impact owing to deformation of upper-side annular cover portion 37 is insufficient and consequently application of a strong impact to lower-side annular cover portion 36 is likely, and because with 0.84 t2/t1, upper-side annular cover portion 37 is too large in thickness and hence deformation per se of upper-side annular cover portion 37 does not sufficiently take place and consequently application of a strong impact to lower-side annular cover portion 37 is likely.

In order to more reliably achieve the effect described above, referring to FIG. 2, gas generator 1A is preferably constructed such that a condition of $0.46 < L1/L0 < 1.47$ is satisfied, where L0 represents an axial length from the end portion of ignition portion 41 on the side of bottom plate portion 11 to the boundary surface between contact portion A and non-contact portion B and L1 represents an axial length of lower-side annular cover portion 36 (a second condition).

This is because, with $L1/L0 \leq 0.46$, the axial length of contact portion A of a portion covered with lower-side annular cover portion 36 is excessively small and hence it becomes difficult to sufficiently hold igniter 40 at the time of actuation of igniter 40 and consequently lifting of igniter 40 is likely, and because with $1.47 \leq L1/L0$, the axial length of non-contact portion B of a portion covered with lower-side annular cover portion 36 is excessively large and hence a ratio of direct application of an impact caused at the time of actuation of igniter 40 to lower-side annular cover portion 36 is high and consequently application of a strong impact to lower-side annular cover portion 36 is likely.

In order to more reliably achieve the effect described above, referring to FIG. 2, gas generator 1A is preferably constructed such that a condition of $L1/L0 \le 1.00$ is satisfied, where L0 represents an axial length from the end portion of ignition portion 41 on the side of bottom plate portion 11 to the boundary surface between contact portion A and non-contact portion B and L1 represents an axial length of lower-side annular cover portion 36 (a third condition). Namely, preferably, step-formed surface 38 of cover portion 35 is located flush with the boundary surface or located on the side of bottom plate portion 11 relative to the boundary surface along the axial direction of the housing. According to such a construction, since non-contact portion B is not covered with lower-side annular cover portion 36, a ratio of direct application of an impact caused at the time of actuation of igniter 40 to lower-side annular cover portion 36 can significantly be lowered.

In this connection, gas generator 1A in the present embodiment described above is constructed such that a condition of $L1<L0$ is satisfied, where L0 represents an axial length from the end portion of ignition portion 41 on the side of bottom plate portion 11 to the boundary surface between contact portion A and non-contact portion B and L1 represents an axial length of lower-side annular cover portion 36.

Here, though both of the first condition and the second condition are more preferably satisfied, a sufficient effect is obtained even when only any of these is satisfied, and a considerable effect is obtained also when neither of these is satisfied. Though both of the first condition and the third condition are more preferably satisfied, a sufficient effect is obtained even when only any of these is satisfied, and a considerable effect is obtained also when neither of these is satisfied.

An axial length L2 of upper-side annular cover portion 37 shown in FIG. 2 should only be long enough for upper-side annular cover portion 37 to cover at least a part of non-contact portion B of squib cup 44. From a point of view of more absorption of an impact described above by upper-side annular cover portion 37, however, axial length L2 is preferably longer.

In gas generator 1A in the present embodiment described above, a corner portion of a portion where the outer circumferential surface and the upper surface (that is, step-formed surface 38) of lower-side annular cover portion 36 are connected to each other and a corner portion of a portion where the upper surface of lower-side annular cover portion 36 (that is, step-formed surface 38) and the outer circumferential surface of upper-side annular cover portion 37 are connected to each other are each formed from an inclined surface and an upper end of upper-side annular cover portion 37 has a tapered shape. When such a shape is adopted, however, such dimensions as thickness t1 of lower-side annular cover portion 36 along the radial direction described above, thickness t2 of upper-side annular cover portion 37 along the radial direction, axial length L0 from the end portion of ignition portion 41 on the side of bottom plate portion 11 to the boundary surface between contact portion A and non-contact portion B, and axial length L1 of lower-side annular cover portion 36 should be known in an effective sense as illustrated.

(First Modification)

Figure 6:
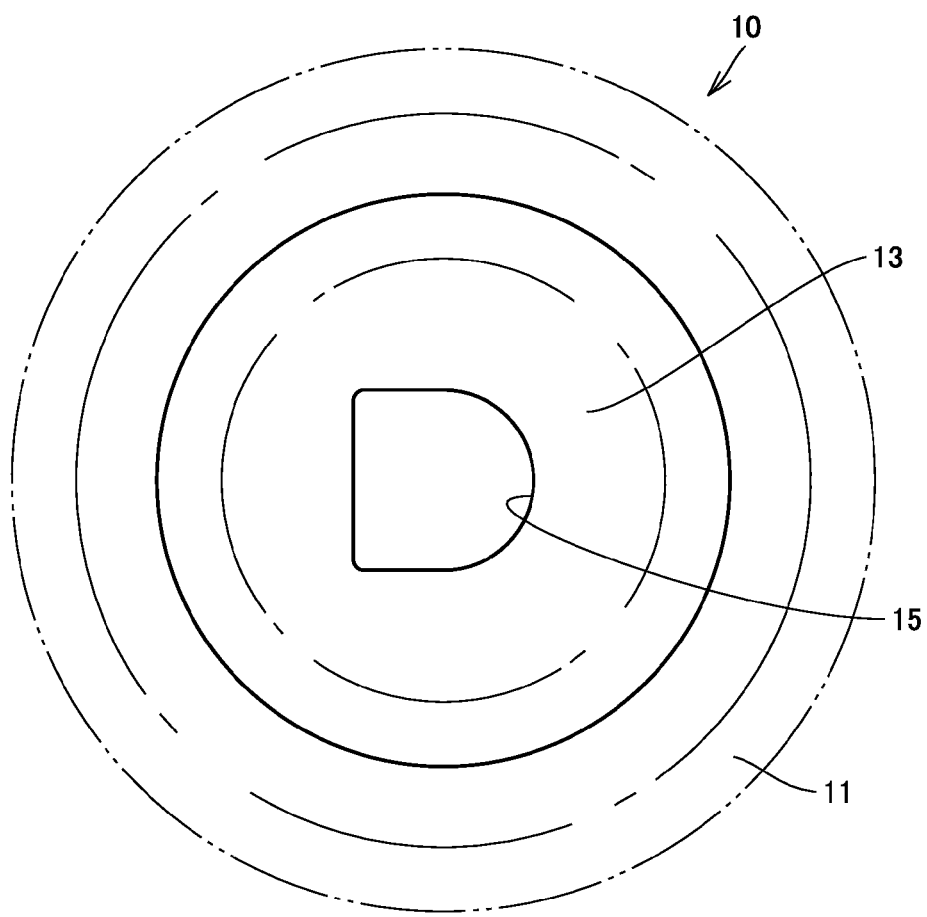
FIG. 6 is a plan view in the vicinity of a protruding cylindrical portion provided in a lower shell of a gas generator according to a first modification.

FIG. 6 is a plan view in the vicinity of a protruding cylindrical portion provided in a lower shell of a gas generator according to a first modification based on the present embodiment. A gas generator 1A1 according to the first modification based on the present embodiment will be described below with reference to this FIG. 6.

Gas generator 1A1 according to the present first modification is different from gas generator 1A in the present embodiment described above only in a construction of lower shell 10 and a construction of fixing portion 30 formed from a resin molding. Specifically, as shown in FIG. 6, gas generator 1A1 according to the present first modification is provided with opening 15 substantially in a D shape in a plan view at the axial end portion located on the side of top plate portion 21, of protruding cylindrical portion 13 provided in lower shell 10, and no protrusion is provided at the axial end portion of protruding cylindrical portion 13. Fixing portion 30 is provided to bury opening 15 substantially in the D shape in the plan view. Thus, though a shape of a portion of fixing portion 30 secured to protruding cylindrical portion 13 is different from that in gas generator 1A in the present embodiment described above, the shape and the construction of other portions are the same as those in gas generator 1A in the present embodiment described above. Opening 15 substantially in the D shape in the plan view described above is a site through which a pair of terminal pins 42 of igniter 40 passes.

In gas generator 1A1 according to the present first modification thus constructed, opening 15 substantially in the D shape in the plan view functions as means for preventing rotation of fixing portion 30 relative to bottom plate portion 11. Namely, since the shape of opening 15 is asymmetric with respect to a point in a two-dimensional state, fixing portion 30 formed from a resin molding cannot readily rotate and rotation of fixing portion 30 relative to bottom plate portion 11 after injection molding can be prevented.

According to such a construction as well, an effect the same as the effect described in the present embodiment described above is obtained, and in addition, it is no longer necessary to provide a protrusion for prevention of rotation on protruding cylindrical portion 13. Therefore, a gas generator can be manufactured more easily and inexpensively.

(Second Modification)

Figure 7:
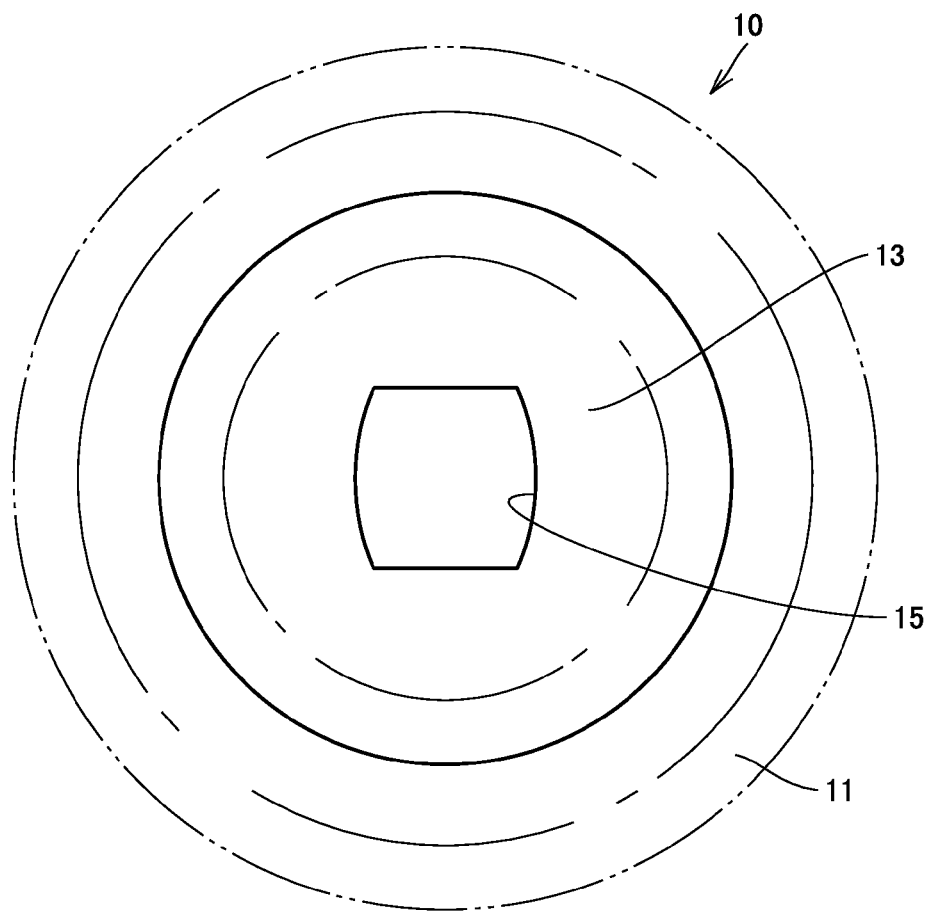
FIG. 7 is a plan view in the vicinity of a protruding cylindrical portion provided in a lower shell of a gas generator according to a second modification.

FIG. 7 is a plan view in the vicinity of a protruding cylindrical portion provided in a lower shell of a gas generator according to a second modification based on the present embodiment. A gas generator 1A2 according to the second modification based on the present embodiment will be described below with reference to this FIG. 7.

Gas generator 1A2 according to the present second modification is different from gas generator 1A in the present embodiment described above only in a construction of lower shell 10 and a construction of fixing portion 30 formed from a resin molding. Specifically, as shown in FIG. 7, gas generator 1A2 according to the present second modification is provided with opening 15 in a barrel shape in a plan view at the axial end portion located on the side of top plate portion 21, of protruding cylindrical portion 13 provided in lower shell 10, and no protrusion is provided at the axial end portion of protruding cylindrical portion 13. Fixing portion 30 is provided to bury opening 15 in the barrel shape in the plan view. Thus, though a shape of a portion of fixing portion 30 secured to protruding cylindrical portion 13 is different from that in gas generator 1A in the present embodiment described above, the shape and the construction of other portions are the same as those in gas generator 1A in the present embodiment described above. Opening 15 in the barrel shape in the plan view described above is a site through which a pair of terminal pins 42 of igniter 40 passes.

In gas generator 1A2 according to the present second modification thus constructed, opening 15 in the barrel shape in the plan view functions as means for preventing rotation of fixing portion 30 relative to bottom plate portion 11. Namely, since the shape of opening 15 is asymmetric with respect to a point in a two-dimensional state, fixing portion 30 formed from a resin molding cannot readily rotate and rotation of fixing portion 30 relative to bottom plate portion 11 after injection molding can be prevented.

According to such a construction as well, an effect the same as the effect described in the present embodiment described above is obtained, and in addition, it is no longer necessary to provide a protrusion for prevention of rotation on protruding cylindrical portion 13. Therefore, a gas generator can be manufactured more easily and inexpensively.

(Confirmation Test)

A first confirmation test and a second confirmation test conducted for confirming a difference in performance due to a difference in construction of the protruding cylindrical portion provided in the lower shell, among the gas generator in the first embodiment, the gas generator according to the first modification, and the gas generator according to the second modification described above will be described below.

In the first confirmation test, a plurality of gas generators 1A in the first embodiment, gas generators 1A1 according to the first modification, and gas generators 1A2 according to the second modification were actually prototyped. An average value of magnitude of external force was found by measuring magnitude of external force at the time when the fixing portion formed from the resin molding provided in the gas generator broke (that is, the fixing portion rotated relative to the bottom plate portion) as a result of actual application of external force in a direction of rotation of the fixing portion. In addition, an average value of magnitude of external force was found by measuring magnitude of external force at the time when a male connector broke as a result of actual application of external force to the male connector in a direction of rotation with the male connector being introduced in the female connector portion provided in the fixing portion. Durability of a portion associated with the fixing portion was thus confirmed.

Figure 8:
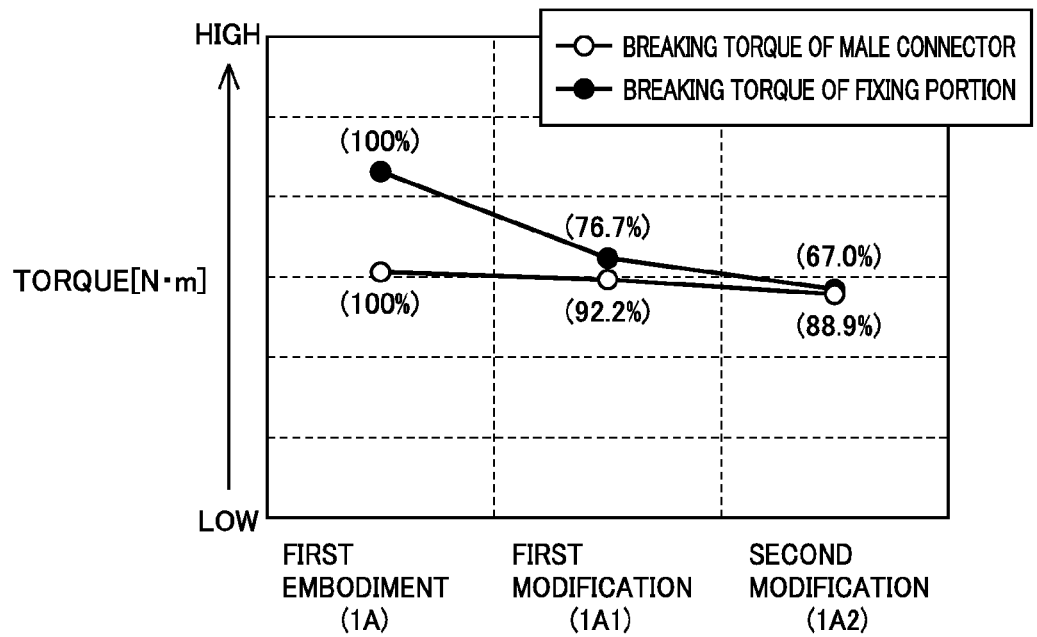
FIG. 8 is a graph showing results in a first confirmation test for confirming a difference in performance due to a difference in construction of the protruding cylindrical portion provided in the lower shell, among the gas generator in the first embodiment of the present invention, the gas generator according to the first modification, and the gas generator according to the second modification.

FIG. 8 is a graph showing results in the first confirmation test. The ordinate in the graph represents magnitude of torque of external force applied to the fixing portion or the male connector, and a position on the ordinate corresponding to each point shown in the graph represents an average value of torque at the time of occurrence of breakage. A numeric value added in the parentheses to each point shown in the graph shows in percentage, an average value of torque at the time when the fixing portion and the male connector in each of gas generator 1A in the first embodiment, gas generator 1A1 according to the first modification, and gas generator 1A2 according to the second modification broke, with the average value of torque at the time of occurrence of breakage in the fixing portion and the male connector in gas generator 1A in the first embodiment being defined as the reference.

As shown in FIG. 8, it was confirmed that both of gas generator 1A1 according to the first modification and gas generator 1A2 according to the second modification were equal to gas generator 1A in the first embodiment in durability of the male connector in the case of application of external force in the direction of rotation to the male connector. It was confirmed, on the other hand, that gas generator 1A1 according to the first modification and gas generator 1A2 according to the second modification were both lower than gas generator 1A in the first embodiment in durability of the fixing portion at the time of application of external force in the direction of rotation to the fixing portion.

Breaking torque of the fixing portion in each of gas generator 1A1 according to the first modification and gas generator 1A2 according to the second modification, however, is greater than breaking torque of the male connector thereof. Therefore, when an actual state of use is assumed, it can be determined that the fixing portion will not be broken before the male connector is broken. It was confirmed that rotation of the fixing portion relative to the bottom plate portion could sufficiently be suppressed whichever structure may be adopted.

In the second confirmation test, a plurality of gas generators 1A in the first embodiment, gas generators 1A1 according to the first modification, and gas generators 1A2 according to the second modification were actually prototyped, and they were placed in a hydroburst tester in order to measure a burst pressure. Here, in measurement, an internal pressure at the time when deformation has begun at the axial end portion on the side of the top plate portion of the protruding cylindrical portion which was provided with the opening, with increase in pressure in the housing, was measured as a primary peak, and an internal pressure at the time when leakage occurred from the inside of the housing to the outside was measured as a secondary peak. From a point of view of ensuring a stable operation during actuation of the gas generator, it can be concluded in particular that the primary peak preferably takes a high value.

Figure 9:
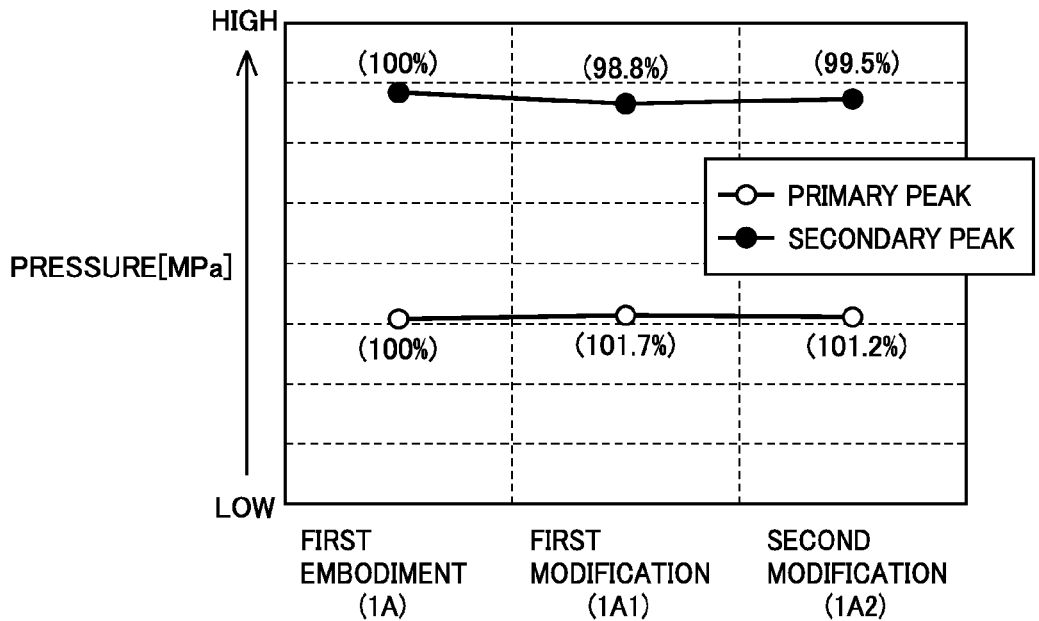
FIG. 9 is a graph showing results in a second confirmation test for confirming a difference in performance due to a difference in construction of the protruding cylindrical portion provided in the lower shell, among the gas generator in the first embodiment of the present invention, the gas generator according to the first modification, and the gas generator according to the second modification.

FIG. 9 is a graph showing results in the second confirmation test. The ordinate in the graph represents magnitude of a pressure in the housing, and a position on the ordinate corresponding to each point shown in the graph represents an average value of a pressure at the time when the primary peak and the secondary peak described above were each measured. A numeric value added in the parentheses to each point shown in the graph shows in percentage, an average value of a pressure at the time when the primary peak and the secondary peak of each of gas generator 1A in the first embodiment, gas generator 1A1 according to the first modification, and gas generator 1A2 according to the second modification were measured, with the average value of a pressure at the time of measurement of the primary peak and the secondary peak of gas generator 1A in the first embodiment being defined as the reference.

As shown in FIG. 9, it was confirmed that gas generator 1A1 according to the first modification and gas generator 1A2 according to the second modification were both equal to gas generator 1A in the first embodiment in values for the primary peak and the secondary peak. Therefore, it was confirmed that resistance to pressure of the housing could sufficiently be ensured whichever structure may be adopted.

It can be concluded from the results above that, whichever structure of gas generator 1A in the first embodiment, gas generator 1A1 according to the first modification, and gas generator 1A2 according to the second modification may be adopted, achievement of the gas generator high in performance and reliability was confirmed also experimentally.

Though detailed description will not be provided here, a factor of safety was calculated, which represents absence of a failure in a gas generator even when a fixing portion formed from a resin molded portion experiences compressive deformation with increase in pressure in a housing caused during actuation of the gas generator based on actual use conditions assumed for each of gas generator 1A in the first embodiment, gas generator 1A1 according to the first modification, and gas generator 1A2 according to the second modification. Then, it has also been confirmed that a very high factor of safety can be ensured with any structure.

Second Embodiment

Figure 10:
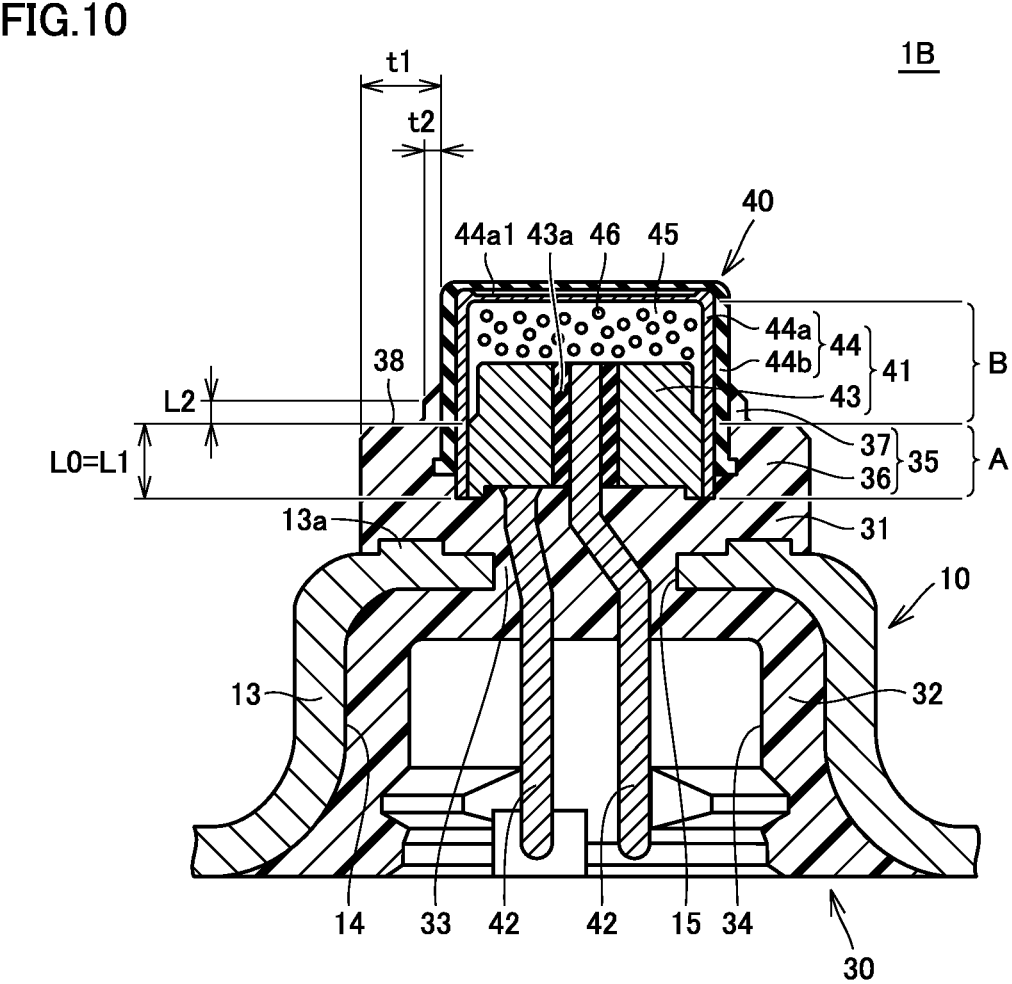
FIG. 10 is an enlarged schematic cross-sectional view showing a structure in the vicinity of an igniter of a gas generator in a second embodiment of the present invention.

FIG. 10 is an enlarged schematic cross-sectional view showing a structure in the vicinity of an igniter of a gas generator in a second embodiment of the present invention. A gas generator 1B in the present embodiment will be described below with reference to this FIG. 10.

As shown in FIG. 10, gas generator 1B in the present embodiment is basically the same in construction as gas generator 1A in the first embodiment described above, and is different from gas generator 1A in the first embodiment described above only in that a condition of L0=L1 is satisfied, where L0 represents an axial length from the end portion of ignition portion 41 on the side of bottom plate portion 11 to the boundary surface between contact portion A and non-contact portion B and L1 represents an axial length of lower-side annular cover portion 36. Namely, gas generator 1B in the present embodiment is constructed such that step-formed surface 38 of cover portion 35 is flush with the boundary surface.

According to such a construction as well, an effect the same as the effect described in the first embodiment described above is obtained and occurrence of a failure during operation can reliably be prevented.

Third Embodiment

Figure 11:
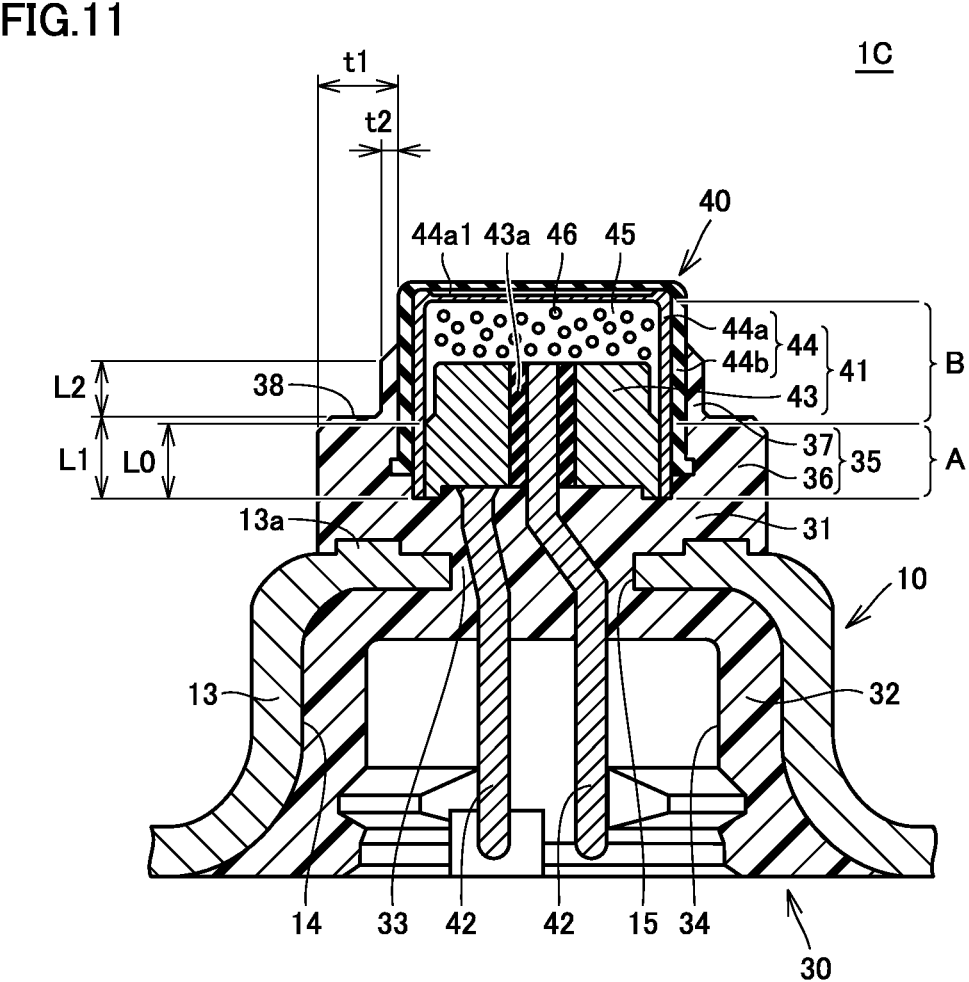
FIG. 11 is an enlarged schematic cross-sectional view showing a structure in the vicinity of an igniter of a gas generator in a third embodiment of the present invention.

FIG. 11 is an enlarged schematic cross-sectional view showing a structure in the vicinity of an igniter of a gas generator in a third embodiment of the present invention. A gas generator 1C in the present embodiment will be described below with reference to this FIG. 11.

As shown in FIG. 11, gas generator 1C in the present embodiment is basically the same in construction as gas generator 1A in the first embodiment described above, and different from gas generator 1A in the first embodiment described above only in that a condition of L0<L1 is satisfied, where L0 represents an axial length from the end portion of ignition portion 41 on the side of bottom plate portion 11 to the boundary surface between contact portion A and non-contact portion B and L1 represents an axial length of lower-side annular cover portion 36 and that axial length L2 of upper-side annular cover portion 37 is longer. Namely, gas generator 1C in the present embodiment is constructed such that step-formed surface 38 of cover portion 35 is located on the side of top plate portion 21 relative to the boundary surface.

Gas generator 1C in the present embodiment, however, is constructed such that a condition of L1/L0<1.47 is satisfied, where L0 represents an axial length from the end portion of ignition portion 41 on the side of bottom plate portion 11 to the boundary surface between contact portion A and non-contact portion B and L1 represents an axial length of lower-side annular cover portion 36, in order to prevent a ratio of direct application of an impact caused at the time of actuation of igniter 40 to lower-side annular cover portion 36 from increasing.

According to such a construction as well, an effect the same as the effect described in the first embodiment described above is obtained and occurrence of a failure during operation can reliably be prevented.

Fourth Embodiment

Figure 12:
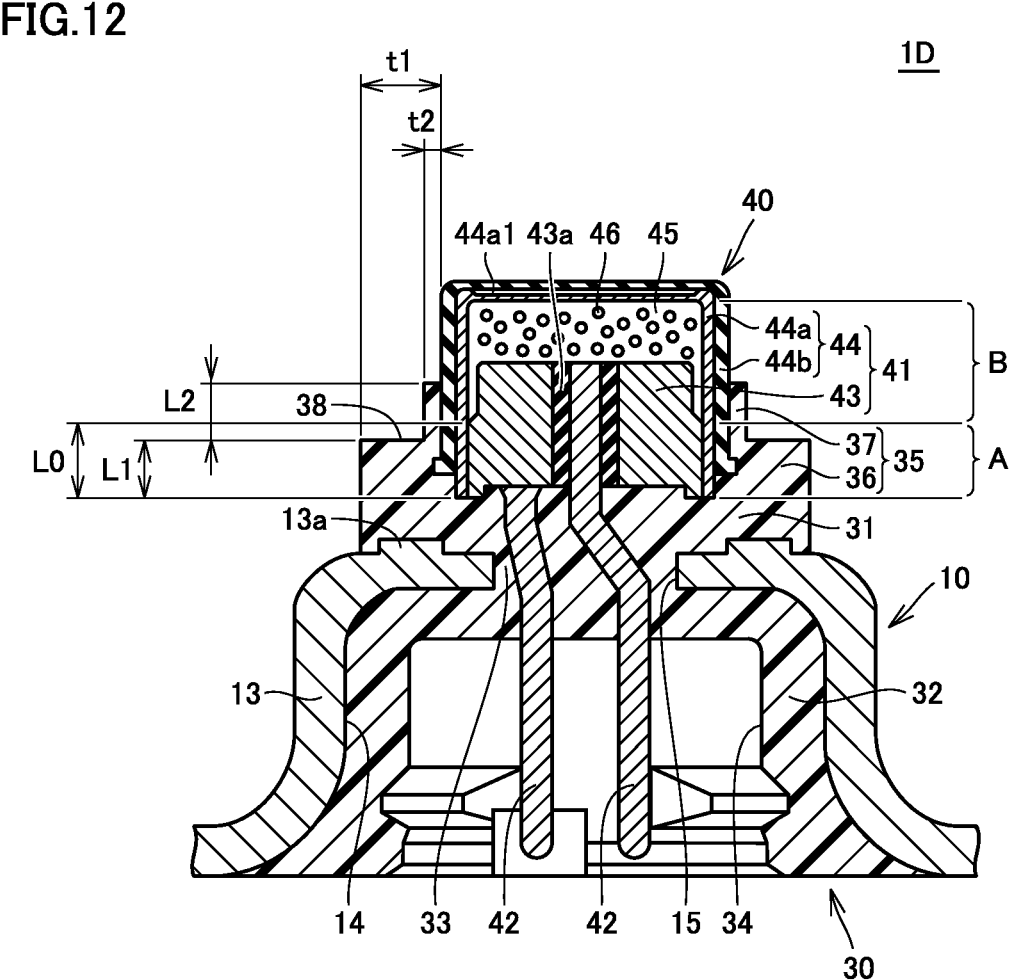
FIG. 12 is an enlarged schematic cross-sectional view showing a structure in the vicinity of an igniter of a gas generator in a fourth embodiment of the present invention.

FIG. 12 is an enlarged schematic cross-sectional view showing a structure in the vicinity of an igniter of a gas generator in a fourth embodiment of the present invention. A gas generator 1D in the present embodiment will be described below with reference to this FIG. 12.

As shown in FIG. 12, gas generator 1D in the present embodiment is basically the same in construction as gas generator 1A in the first embodiment described above, and different from gas generator 1A in the first embodiment described above only in that a corner portion of a portion where the outer circumferential surface and the upper surface (that is, step-formed surface 38) of lower-side annular cover portion 36 are connected to each other, a corner portion of a portion where the upper surface of lower-side annular cover portion 36 (that is, step-formed surface 38) and the outer circumferential surface of upper-side annular cover surface 37 are connected to each other, and a corner portion of a portion where the outer circumferential surface and the upper surface of upper-side annular cover portion 37 are connected to each other are each in a shape at a right angle in a cross-section including an axial line of cover portion 35.

According to such a construction as well, an effect the same as the effect described in the first embodiment described above is obtained and occurrence of a failure during operation can reliably be prevented.

Fifth Embodiment

Figure 13:
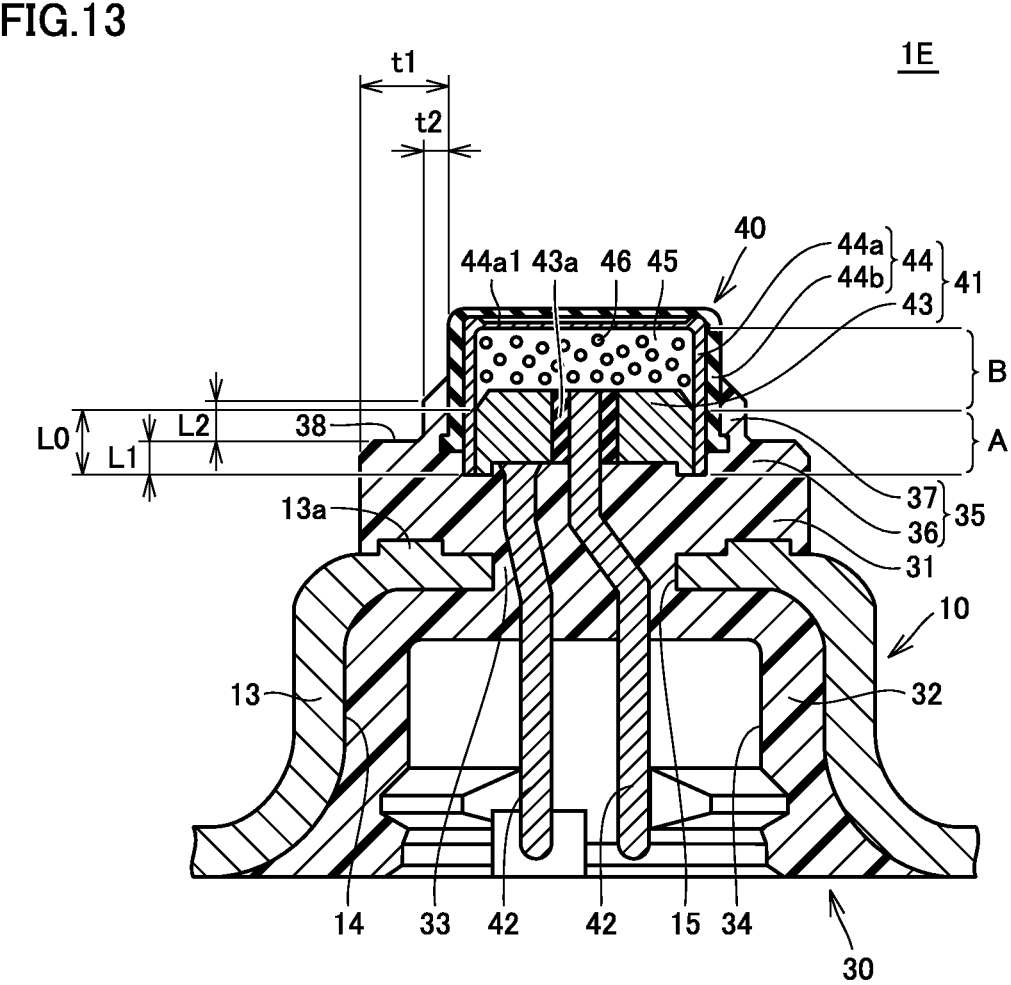
FIG. 13 is an enlarged schematic cross-sectional view showing a structure in the vicinity of an igniter of a gas generator in a fifth embodiment of the present invention.

FIG. 13 is an enlarged schematic cross-sectional view showing a structure in the vicinity of an igniter of a gas generator in a fifth embodiment of the present invention. A gas generator 1E in the present embodiment will be described below with reference to this FIG. 13.

As shown in FIG. 13, gas generator 1E in the present embodiment is basically the same in construction as gas generator 1A in the first embodiment described above, and different from gas generator 1A in the first embodiment described above only in that an axial length of squib cup 44 and an axial direction of plug 43 are smaller and that thickness t2 of upper-side annular cover portion 37 along the radial direction is greater.

According to such a construction as well, an effect the same as the effect described in the first embodiment described above is obtained and occurrence of a failure during operation can reliably be prevented.

(Verification Test)

A verification test in which gas generators according to Examples in accordance with the first to fifth embodiments of the present invention described above were actually prototyped and conditions of operation at the time when these were operated were verified will be described below. For comparison, a gas generator according to a comparative example not in accordance with the first to fifth embodiments of the present invention described above was also actually prototyped, and conditions of operation at the time when this was operated will also be described.

FIG. 14 is a table summarizing conditions and results in the verification test for verifying conditions of operation at the time when gas generators according to Examples and Comparative Examples were operated. Gas generators according to Examples 1 to 10 shown in FIG. 14 were each constructed such that the cover portion had the stepped shape, and gas generators according to Comparative Examples 1 to 3 were each constructed such that the cover portion was not provided with the stepped shape but it had a cylindrical shape having a prescribed thickness. Regarding the gas generators according to Comparative Examples 1 to 3, a dimension of the cylindrical cover portion is given in a field showing a dimension of the lower-side annular cover portion.

As shown in FIG. 14, in each of the gas generators according to Examples 1 to 10 and Comparative Examples 1 to 3, axial length L0 from the end portion of the ignition portion on the side of the bottom plate portion to the boundary surface between the contact portion and the non-contact portion was set to 2.00 mm. In the gas generators according to Examples 1 to 10, thickness t1 of the lower-side annular cover portion in the radial direction was set to 2.65 mm, and in the gas generators according to Comparative Examples 1 to 3, a thickness of the cylindrical cover portion in the radial direction was set to 2.65 mm.

Dimensions including axial length L1 of the lower-side annular cover portion as well as thickness t2 in the radial direction and axial length L2 of the upper-side annular cover portion were differed among the gas generators according to Examples 1 to 10. A dimension of the axial length of the cylindrical cover portion was also differed among the gas generators according to Comparative Examples 1 to 3. A specific dimension is as shown in FIG. 14.

In the gas generators according to Examples 1 to 10 and Comparative Examples 1 to 3, a shape of the opening for passage of the terminal pin provided in the protruding cylindrical portion was annular in a plan view and four protrusions in total protruding toward the top plate portion so as to surround the opening were provided at the axial end portion of the protruding cylindrical portion located on the side of the top plate portion.

Here, 6 samples of the gas generator according to each of Examples 1 to 10 and Comparative Examples 1 to 3 were prepared as prototypes, of which three samples were operated in a high-temperature environment and remaining three samples were operated in a low-temperature environment.

In verification, whether or not the lower-side annular cover portion was broken and a degree of breakage, whether or not the upper-side annular cover portion was broken, and whether or not the igniter was lifted in each sample after operation of the gas generators according to Examples 1 to 10 were checked through visual inspection, and whether or not the cylindrical cover portion was broken and a degree of breakage and whether or not the igniter was lifted in the gas generator in each of Comparative Examples 1 to 3 were checked through visual inspection. Whether or not the cylindrical cover portion was broken and a degree of breakage in each sample of the gas generator according to each of Comparative Examples 1 to 3 are given in fields showing whether or not the lower-side annular cover portion was broken and a degree of breakage.

In determination, the significantly broken lower-side annular cover portion or the lifted igniter observed in any one or more of the samples was defined as "NG", absence of breakage of the lower-side annular cover portion and lifting of the igniter in each sample was defined as "good", and a small degree of breakage in spite of breakage in the lower-side annular cover portion and absence of lifting of the igniter was defined as "OK". Regarding a degree of breakage of the lower-side annular cover portion, generation of a crack reaching the outside was defined as large breakage (large degree) and generation of a minor damage not reaching the outside was defined as small breakage (small degree).

Consequently, as shown in FIG. 14, a result "good" was obtained in the gas generators in Examples 1 to 4, 6, 7, 9, and 10, a result "OK" was obtained in the gas generators in Examples 5 and 8, and a result "NG" was obtained in the gas generators in Comparative Examples 1 to 3.

Here, the cause of lifting of the igniter in the gas generator according to Comparative Example 1 is estimated as the excessively small axial length of the contact portion in the portion covered with the cylindrical cover portion, which led to difficulty in sufficient holding of the igniter at the time of actuation of the igniter.

The cause of breakage of the cylindrical cover portion in the gas generators according to Comparative Examples 2 and 3 is estimated as the thick cover portion of the portion covering not only the contact portion but also the non-contact portion, which led to application of an impact caused at the time of actuation of the igniter to the entire cylindrical cover portion as an strong impact.

On the other hand, the reason for no or minor breakage in the lower-side annular cover portion and absence of lifting of the igniter in the gas generators according to Examples 1 to 10 is estimated as follows. The lower-side annular cover portion and the upper-side annular cover portion had appropriate dimensions so that a ratio of direct application of an impact caused at the time of actuation of the igniter to the lower-side annular cover portion was low, and appropriate deformation of the upper-side annular cover portion due to the impact absorbed energy of the impact so that force transmitted to the lower-side annular cover portion through the upper-side annular cover portion was significantly weak and consequently the impact applied to the lower-side annular cover portion was very weak.

It is understood that a ratio (t2/t1) is suitably within the range of 0.24<t2/t1<0.84 described above in view of setting of a minimum value and a maximum value for thickness t2 of the upper-side annular cover portion along the radial direction to 0.65 mm and 2.20 mm, respectively, which is associated with thickness t1 (2.65 mm) of the lower-side annular cover portion along the radial direction in the gas generators according to Examples 1 to 10 determined as "good" or "OK". It is understood that the ratio (t2/t1) is particularly suitably within the range of 0.24<t2/t1<0.67 in consideration of the maximum value for thickness t2 of the upper-side annular cover portion along the radial direction being 1.75 mm in the gas generators according to Examples 1 to 4, 6, 7, 9, and 10 determined as "good".

It is understood that a ratio (L1/L0) is suitably within the range of 0.46<L1/L0<1.47 described above in view of setting of a minimum value and a maximum value for axial length L1 of the lower-side annular cover portion to 0.93 and 2.93, respectively, which is associated with axial length L0 (2.00 mm) from the end portion of the ignition portion on the side of the bottom plate portion to the boundary surface between the contact portion and the non-contact portion in the gas generators according to Examples 1 to 10 determined as "good" or "OK". It is understood that the ratio (L1/L0) is particularly suitably within the range of 0.46<L1/L0<1.17 in consideration of the maximum value for axial length L1 of the upper-side annular cover portion being 2.33 mm in the gas generators according to Examples 1 to 4, 6, 7, 9, and 10 determined as "good".

It was confirmed from the results above that occurrence of a failure during operation could reliably be prevented by the gas generators in the first to fifth embodiments of the present invention described above.

In the first to fifth embodiments and the modifications thereof of the present invention described above, a case where an upper shell and a lower shell are formed from a press-formed product formed by press-working a member made of metal has been exemplified, however, limitation thereto is not necessarily intended. An upper shell and a lower shell formed by combination of press-working and another type of working (forging, drawing, cutting, or the like) may be employed, or an upper shell and a lower shell formed only by another type of working may be employed.

Though a case that a protruding cylindrical portion is provided in a lower shell has been exemplified in the first to fifth embodiments and the modifications thereof of the present invention described above, the present invention can naturally be applied also to a gas generator constructed without a protruding cylindrical portion being provided.

Moreover, characteristic features shown in the first to fifth embodiments and the modifications thereof of the present invention described above can naturally be combined with one another within the scope allowable in light of the gist of the present invention, and for example, the shape of the corner portion of the cover portion shown in the fourth embodiment can be applied to the second, third, and fifth embodiments. Furthermore, the construction of the protruding cylindrical portion shown in the first modification or the second modification based on the first embodiment can also be applied to the second to fifth embodiments. A specific shape of various components such as a housing, an igniter, a fixing portion, and an enhancer cup can also naturally be modified as appropriate. For example, instead of forming a squib cup of an igniter to have a double-layered structure, the squib cup may be formed from any one of an inner cup and an outer cup described above.

Thus, the embodiments and the modifications thereof disclosed herein are illustrative and non-restrictive in every respect. The technical scope of the present invention is delimited by the terms of the claims, and includes any modifications within the scope and meaning equivalent to the terms of the claims.

REFERENCE SIGNS LIST 1A, 1A1, 1A2, 1B to 1E gas generator; 10 lower shell; 11 bottom plate portion; 12 circumferential wall portion; 13 protruding cylindrical portion; 13a protrusion; 14 depression portion; 15 opening; 20 upper shell; 21 top plate portion; 22 circumferential wall portion; 23 gas discharge opening; 24 sealing tape; 30 fixing portion; 31 inner fixing portion; 32 outer fixing portion; 33 coupling portion; 34 female connector portion; 35 cover portion; 36 lower-side annular cover portion; 37 upper-side annular cover portion; 38 step-formed surface; 40 igniter; 41 ignition portion; 42 terminal pin; 43 plug; 43a joint portion; 44 squib cup; 44a inner cup; 44a1 score; 44b outer cup; 45 ignition chamber; 46 ignition agent; 50 enhancer cup; 51 top wall portion; 52 sidewall portion; 53 extension portion; 54 tip end portion; 55 enhancer chamber; 56 enhancer agent; 60 combustion chamber; 61 gas generating agent; 62 lower-side supporting member; 63 upper-side supporting member; 64 cushion material; 70 filter; A contact portion; and B non-contact portion.

The invention claimed is:

1. A gas generator, comprising:
a cylindrical housing containing a combustion chamber comprising a top plate portion and a bottom plate portion closing axial end portions and a circumferential wall portion provided with a gas discharge opening and accommodating a gas generating agent;
an igniter charged with an ignition agent for burning said gas generating agent; and
a fixing portion fixing said igniter to said bottom plate portion,
said bottom plate portion being provided with an opening,
said igniter including an ignition portion defining an ignition chamber accommodating said ignition agent, and including a terminal pin having a first end connected to said ignition portion for igniting said ignition agent and a second end arranged to pass through said opening in the bottom plate,
said ignition portion having a substantially cylindrical cup body having a closed upper end and an open lower end and a plug closing the lower end of said cup body and supporting said terminal pin,
said cup body including a contact portion located on a side of said bottom plate portion and being in contact with said plug and a non-contact portion located on a side of said top plate portion and facing said ignition chamber as not being in contact with said plug,
said fixing portion being formed from a resin molding secured to said bottom plate portion and said igniter, by attaching a fluid resin material to said bottom plate portion and said igniter so as to close said opening and solidifying the fluid resin material,
said resin molding including an annular cover portion secured to an outer circumferential surface of said cup body so as to cover the outer circumferential surface,
said cover portion having a lower-side annular cover portion provided on the side of said bottom plate portion so as to cover at least a part of said contact portion, and an upper-side annular cover portion provided on the side of said top plate portion so as to cover at least a part of said non-contact portion, and
said cover portion being formed in a stepped shape having a substantially two-dimensionally annular step-formed surface substantially orthogonal to an axial direction of said cup body, with a thickness of said upper-side annular cover portion along a radial direction being smaller than a thickness of said lower-side annular cover portion along the radial direction to provide said stepped shape,
wherein said step-formed surface is located in an axial direction of the housing either at a boundary surface between said contact portion and said non-contact portion, or below said boundary surface on the side of said bottom plate portion relative to said boundary surface along the axial direction of said housing.

2. The gas generator according to claim 1, wherein t1 and t2 satisfy a condition of 0.24<t2/t1<0.84, where t1 represents a thickness of said lower-side annular cover portion along the radial direction and t2 represents a thickness of said upper-side annular cover portion along the radial direction.

3. The gas generator according to claim 2, wherein said bottom plate portion has a protruding cylindrical portion protruding toward said top plate portion, and said opening is provided at an axial end portion of said protruding cylindrical portion located on the side of said top plate portion.

4. The gas generator according to claim 1, wherein said bottom plate portion has a protruding cylindrical portion protruding toward said top plate portion, and said opening is provided at an axial end portion of said protruding cylindrical portion located on the side of said top plate portion.

* * * * *